US010384239B2

(12) United States Patent
Fedigan et al.

(10) Patent No.: US 10,384,239 B2
(45) Date of Patent: Aug. 20, 2019

(54) METHODS AND APPARATUS FOR ULTRASONIC LENS CLEANER USING CONFIGURABLE FILTER BANKS

(71) Applicant: TEXAS INSTRUMENTS INCORPORATED, Dallas, TX (US)

(72) Inventors: Stephen John Fedigan, Plano, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/492,315

(22) Filed: Apr. 20, 2017

(65) Prior Publication Data

US 2018/0085784 A1 Mar. 29, 2018

Related U.S. Application Data

(60) Provisional application No. 62/407,762, filed on Oct. 13, 2016, provisional application No. 62/400,171, filed on Sep. 27, 2016.

(51) Int. Cl.

| | |
|---|---|
| ***F26B 5/02*** | (2006.01) |
| ***B08B 7/02*** | (2006.01) |
| ***B60S 1/56*** | (2006.01) |
| ***B06B 1/06*** | (2006.01) |
| ***B06B 1/02*** | (2006.01) |
| ***G02B 27/00*** | (2006.01) |
| ***B60S 1/02*** | (2006.01) |

(52) U.S. Cl.

CPC .............. *B08B 7/028* (2013.01); *B06B 1/023* (2013.01); *B06B 1/0284* (2013.01); *B06B 1/06* (2013.01); *B60S 1/02* (2013.01); *B60S 1/56* (2013.01); *F26B 5/02* (2013.01); *G02B 27/0006* (2013.01)

(58) Field of Classification Search

CPC ....... B08B 7/028; B06B 1/023; B06B 1/0284; B06B 1/06; B06B 1/02; B60S 1/56; G02B 27/0006; F26B 5/02

USPC .......................................................... 34/401

See application file for complete search history.

(56) References Cited

U.S. PATENT DOCUMENTS

| | | | |
|---|---|---|---|
| 3,681,626 | A | 8/1972 | Puskas |
| 4,019,073 | A | 4/1977 | Vishnevsky et al. |
| 4,271,371 | A | 6/1981 | Furuichi et al. |

(Continued)

FOREIGN PATENT DOCUMENTS

| | | |
|---|---|---|
| EP | 1703062 | 9/2006 |
| EP | 2777579 B1 | 4/2015 |

(Continued)

OTHER PUBLICATIONS

Howard, "High speed photography of ultrasonic atomization," Thesis, Brown University, May 13, 2010, 39 pages.

(Continued)

*Primary Examiner* — Stephen M Gravini

(74) *Attorney, Agent, or Firm* — Michael A. Davis, Jr.; Charles A. Brill; Frank D. Cimino

(57) ABSTRACT

Methods and apparatus for ultrasonic lens cleaner using configurable filter banks are disclosed. In certain described examples, the methods and apparatus can expel fluid from a droplet on an optical surface using an ultrasonic transducer mechanically coupled to the optical surface and having first and second resonant frequency bands.

20 Claims, 10 Drawing Sheets

(56) References Cited

U.S. PATENT DOCUMENTS

| | | | | | |
|---|---|---|---|---|---|
| 4,556,467 | A | | 12/1985 | Kuhn et al. | |
| 4,607,652 | A | | 8/1986 | Yung | |
| 4,691,725 | A | | 9/1987 | Parisi | |
| 4,710,233 | A | | 12/1987 | Hohmann et al. | |
| 4,836,684 | A | | 6/1989 | Javorik et al. | |
| 4,852,592 | A | | 8/1989 | DeGangi et al. | |
| 4,870,982 | A | | 10/1989 | Liu | |
| 5,005,015 | A | | 4/1991 | Dehn et al. | |
| 5,071,776 | A | | 12/1991 | Matsushita et al. | |
| 5,113,116 | A | * | 5/1992 | Wilson | B06B 1/0253 310/316.01 |
| 5,178,173 | A | | 1/1993 | Erickson et al. | |
| 6,064,259 | A | | 5/2000 | Takita | |
| 6,607,606 | B2 | | 8/2003 | Bronson | |
| 7,705,517 | B1 | | 4/2010 | Koen et al. | |
| 8,286,801 | B2 | * | 10/2012 | Youngs | B01D 33/04 210/400 |
| 8,293,026 | B1 | | 10/2012 | Bodor et al. | |
| 8,494,200 | B2 | * | 7/2013 | Ram | H04R 1/086 381/322 |
| 8,899,761 | B2 | | 12/2014 | Tonar et al. | |
| 9,080,961 | B2 | * | 7/2015 | Adachi | B29B 13/08 |
| 9,084,053 | B2 | * | 7/2015 | Parkins | H04R 1/086 |
| 9,226,076 | B2 | * | 12/2015 | Lippert | H04R 1/023 |
| 9,253,297 | B2 | * | 2/2016 | Abe | H04R 1/086 |
| 9,573,165 | B2 | * | 2/2017 | Weber | B05D 5/04 |
| 2006/0285108 | A1 | * | 12/2006 | Morrisroe | F23C 99/003 356/316 |
| 2007/0046143 | A1 | * | 3/2007 | Blandino | B06B 1/0238 310/317 |
| 2007/0159422 | A1 | * | 7/2007 | Blandino | A01M 1/2033 345/82 |
| 2008/0248416 | A1 | * | 10/2008 | Norikane | B01J 2/04 430/137.18 |
| 2010/0171872 | A1 | | 7/2010 | Okano | |
| 2013/0170685 | A1 | * | 7/2013 | Oh | H04R 1/2888 381/334 |
| 2013/0242481 | A1 | * | 9/2013 | Kim | H05K 5/06 361/679.01 |
| 2013/0333978 | A1 | * | 12/2013 | Abe | G10K 11/002 181/291 |
| 2014/0218877 | A1 | * | 8/2014 | Wei | H04B 1/3816 361/752 |
| 2014/0253150 | A1 | * | 9/2014 | Menzel | G01R 27/2605 324/664 |
| 2016/0266145 | A1 | | 9/2016 | Li et al. | |
| 2018/0085784 | A1 | * | 3/2018 | Fedigan | B06B 1/023 |
| 2018/0085793 | A1 | * | 3/2018 | Fedigan | B06B 1/023 |
| 2018/0117642 | A1 | | 5/2018 | Magee et al. | |

FOREIGN PATENT DOCUMENTS

| | | | | | |
|---|---|---|---|---|---|
| EP | 2873572 | A1 | | 5/2015 | |
| JP | 2009283069 | A | | 12/2009 | |
| JP | 5608688 | B2 | * | 10/2014 | B01D 33/04 |
| KR | 20130076250 | A | * | 7/2013 | H04R 1/2888 |
| WO | WO-2007005852 | A3 | * | 3/2007 | H04R 1/086 |
| WO | WO-2010104867 | A1 | * | 9/2010 | B01D 33/04 |

OTHER PUBLICATIONS

International Search Report for PCT/US2017/059536 dated Feb. 28, 2018.

Vaseiljev, "Ultrasonic system for solar panel cleaning", Sensors and Actuators A, vol. 200, Oct. 1, 2013, pp. 74-78.

Kazemi, "Substrate cleaning using ultrasonics/megasonics," 2011 IEEE/SEMI Advanced Semiconductor Manufacturing Conference, Saratoga Springs, NY, 2011, pp. 1-6.

Brereton, "Particle Removal by Focused Ultrasound", Journal of Sound and Vibration vol. 173, Issue 5, Jun. 23, 1994, pp. 683-698.

Gale, "Removal of Particulate Contaminants using Ultrasonics and Megasonics: A Review", Particulate Science and Technology, 1994, 13:3-4, 197-211.

Lee, "Smart self-cleaning cover glass for automotive miniature cameras," 2016 IEEE 29th International Conference on Micro Electro Mechanical Systems (MEMS), Shanghai, 2016, pp. 83-86.

International Search Report for PCT Application No. PCT/US2018/016714, dated Jun. 21, 2018 (2 pages).

Graff, "Wave Motion in Elastic Solids", Dover, 1991 (3 pages).

Hagedorn et al., "Travelling Wave Ultrasonic Motors, Part I: Working Principle and Mathematical Modelling of the Stator", Journal of Sound and Vibration, 1992, 155(1), pp. 31-46.

Ziaei-Moayyed et al., "Electrical Deflection of Polar Liquid Streams: A Misunderstood Demonstration," Journal of Chemical Education, vol. 77, No. 11, Nov. 2000 (4 pages).

U.S. Appl. No. 15/492,286, entitled "Methods and Apparatus Using Multistage Ultrasonic Lens Cleaning for Improved Water Removal," filed Apr. 20, 2017 (62 pages).

U.S. Appl. No. 15/492,433, entitled "Methods and Apparatus for Surface Wetting Control," filed Apr. 20, 2017 (46 pages).

U.S. Appl. No. 15/492,395, entitled "Methods and Apparatus for Electrostatic Control of Expelled Material from Lens Cleaners," filed Apr. 20, 2017 (28 pages).

International Search Report for PCT/US2017/064530 dated Apr. 5, 2018.

* cited by examiner

METHODS AND APPARATUS FOR ULTRASONIC LENS CLEANER USING CONFIGURABLE FILTER BANKS

RELATED APPLICATIONS

This application claims the benefit of U.S. Provisional Application Ser. No. 62/400,171 filed Sep. 27, 2016, entitled "Configurable Filter Banks for An Ultrasonic Lens Cleaner" by Stephen John Fedigan and David Patrick Magee and U.S. Provisional Application Ser. No. 62/407,762, filed Oct. 13, 2016, entitled "Two Stage Ultrasonic Lens Cleaning for Improved Water Removal" by Stephen John Fedigan and David Patrick Magee, the disclosures of which are incorporated by reference in their entirety. This application is related to copending U.S. patent application, entitled "Methods and Apparatus Using Multistage Ultrasonic Lens Cleaning for Improved Water Removal", filed on the same day as the present application by Stephen John Fedigan and David Patrick Magee, the disclosure of which is incorporated by reference in its entirety.

FIELD OF THE DISCLOSURE

This disclosure relates generally to ultrasonics and, more particularly, to methods and apparatus for an ultrasonic lens cleaner using configurable filter banks.

BACKGROUND

It's an unfortunate occurrence, but the number of motor vehicle deaths appears to be increasing every year. There are variety of reasons for this trend, including an increase in the driving population. Still, more engineering effort is needed to reduce risk of death or serious injury in automobiles. In addition to avoiding risks to drivers and passengers, more robust obstacle and collision avoidance systems are required to reduce the high cost of damage to automobiles and other property due to collisions.

Fortunately, new technologies are becoming available that manufacturers can incorporate into new automobiles at a reasonable cost. Some promising technologies that may help to improve obstacle and collision avoidance systems are digital camera based surround view and camera monitoring systems. In some cases, cameras can increase safety by being mounted in locations that can give drivers access to alternative perspectives, which is otherwise diminished or unavailable to the driver's usual view through windows or mirrors. While mounting one or more cameras for alternative views can provide many advantages, some challenges may remain.

SUMMARY

Mounting cameras for alternative views may expose optical surfaces associated with cameras to hazards such as fluid droplets (e.g., water droplets) that can interfere with visibility of such alternative views. In the described examples, methods and apparatus for an ultrasonic lens cleaner using configurable filter banks are disclosed. In certain described examples, an apparatus can expel fluid from a droplet on an optical surface using an ultrasonic transducer mechanically coupled to the optical surface and having a plurality of resonant frequency bands. A first amplifier has a first output impedance, while a first filter can be tuned within the first resonant frequency band to facilitate matching the first output impedance of the first amplifier with impedance of the ultrasonic transducer mechanically coupled to the optical surface and to reduce by atomization the fluid droplet from a first droplet size to a second droplet size. Further, a second filter can be tuned within the second resonant frequency band to facilitate matching the first output impedance of the first amplifier with impedance of the ultrasonic transducer mechanically coupled to the optical surface and to reduce by atomization the fluid droplet from the second droplet size to a third droplet size.

In other described examples, a method to expel fluid from a droplet on an optical surface using first and second resonant frequency bands of an ultrasonic transducer mechanically coupled to the optical surface is disclosed. For example, activating a first filter tuned within the first resonant frequency band can facilitate matching a first output impedance of a first amplifier with impedance of the ultrasonic transducer mechanically coupled to the optical surface. Further, generating a first signal can include a first frequency within the first resonant frequency band of the ultrasonic transducer mechanically coupled to the optical surface. The fluid droplet can be reduced by atomization from a first droplet size to a second droplet size.

DETAILED DESCRIPTION

Figure 1:
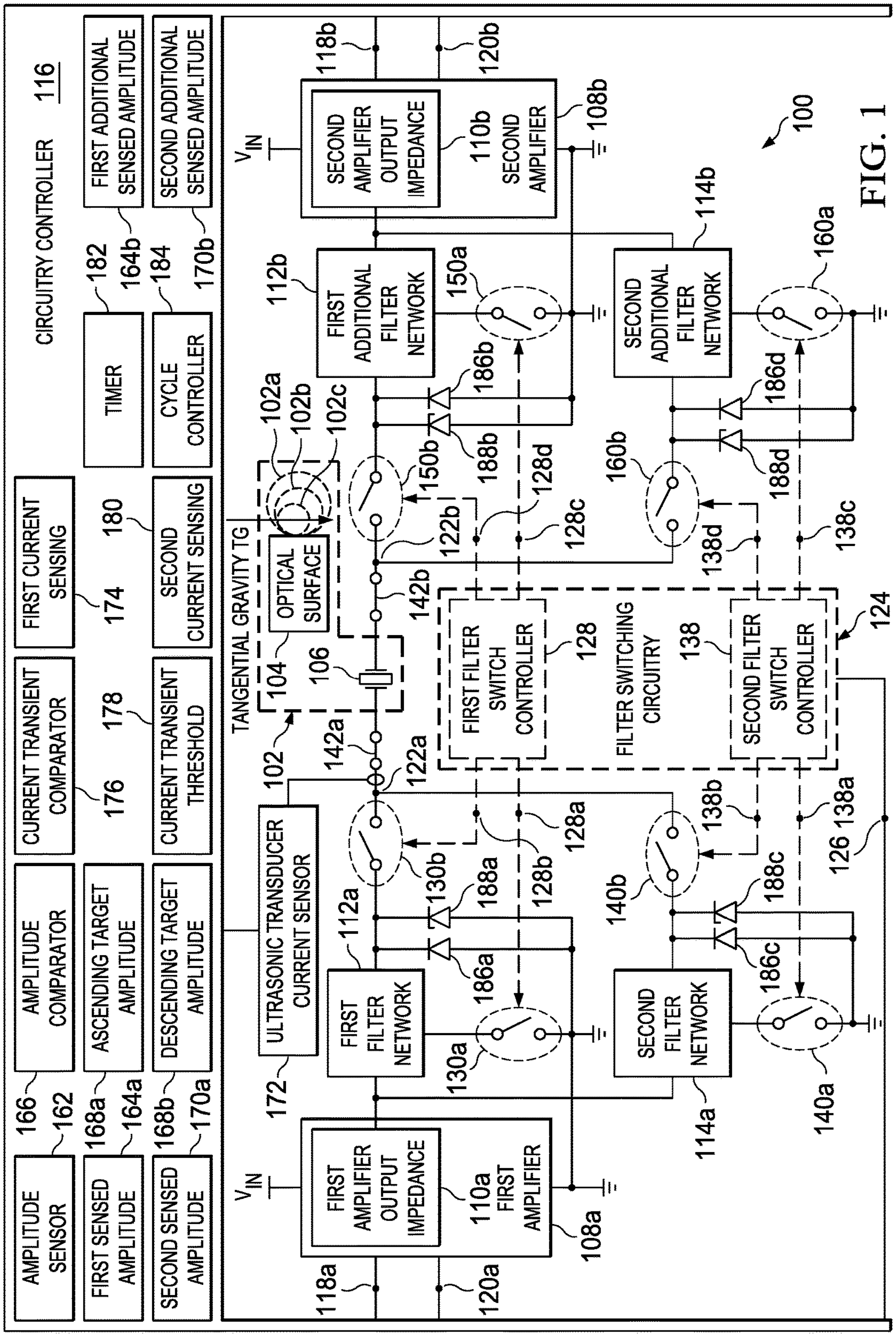
FIG. 1 is partial block diagram of a system according to an embodiment including an apparatus that can expel fluid from a droplet on an optical surface using an ultrasonic transducer mechanically coupled to the optical surface.

FIG. 1 is partial block diagram of a system 100 that can expel fluid from a droplet 102 on an optical surface 104 using an ultrasonic transducer 106 mechanically coupled to the optical surface 104. For example, the ultrasonic transducer 106 can be a piezoelectric ultrasonic transducer 106 including a piezoelectric material (e.g., lead zirconate titanate PZT or niobium doped lead zirconate titanate PNZT.) The mechanical coupling of the ultrasonic transducer 106 with the optical surface 104 is representatively illustrated in the drawings by a dashed line box that encompasses the ultrasonic transducer 106 mechanically coupled to the optical surface 104. The fluid droplet 102 can be disposed on the optical surface 104 and can be coupled with the ultrasonic transducer 106 through the optical surface 104. Accordingly, such coupling of the fluid droplet 102, the ultrasonic transducer 106 and the optical surface 104 is representatively illustrated in the drawings by the dashed line box that encompasses the fluid droplet 102, the ultrasonic transducer 106 and the optical surface 104. In the example of FIG. 1, the ultrasonic transducer 106 mechanically coupled to the optical surface 104 and has a plurality of resonant frequency bands (e.g., first and second resonant frequency bands).

The example of FIG. 1 shows a first amplifier 108*a* having a first output impedance 110*a*. A first filter 112*a* (e.g., first filter network 112*a*) is tuned (e.g., by its corresponding filter component values) within the first resonant frequency band to facilitate matching the first output impedance 110*a* of the first amplifier 108*a* with impedance of the ultrasonic transducer 106 mechanically coupled to the optical surface 104 and to reduce by atomization the fluid droplet 102 from a first droplet size 102*a* to a second droplet size 102*b*. A second filter 114*a* (e.g., second filter network 114*a*) is tuned (e.g., by its corresponding filter component values) within the second resonant frequency band to facilitate matching the first output impedance 110*a* of the first amplifier 108*a* with impedance of the ultrasonic transducer 106 mechanically coupled to the optical surface 104 and to reduce by atomization the fluid droplet 102 from the second droplet size 102*b* to a third droplet size 102*c*. In the drawings: the first droplet size 102*a* is representatively illustrated using a dash-dot-dot-dash line style; the second droplet size 102*b* is representatively illustrated using a dash-dot-dash line style; and the third droplet size 102*c* is representatively illustrated using solid line style.

In the example of FIG. 1, the first filter 112*a* (e.g., first filter network 112*a*) can be tuned (e.g., by its corresponding filter component values) higher in frequency than the second filter 114*a* (e.g., second filter network 114*a*.) Similarly, the first resonant frequency band of the ultrasonic transducer 106 mechanically coupled to the optical surface 104 can be higher in frequency than the second resonant frequency band of the ultrasonic transducer 106 mechanically coupled to the optical surface 104. In the example of FIG. 1, the first resonant frequency band to reduce the fluid droplet 102 from the first droplet size 102*a* to the second droplet size 102*b* is higher in frequency than the second resonant frequency band to reduce the fluid droplet 102 from the second droplet size 102*b* to the third droplet size. For example, the first filter 112*a* (e.g., first filter network 112*a*) can be tuned (e.g., by its corresponding filter component values) within the first resonant frequency band of the ultrasonic transducer 106 mechanically coupled to the optical surface 104 to reduce by atomization the fluid droplet 102 from the first droplet size 102*a* to the second droplet size 102*b*, and so as to be higher in frequency than the second filter 114*a* (e.g., second filter network 114*a*) tuned (e.g., by its corresponding filter component values) within the second resonant frequency band of the ultrasonic transducer 106 mechanically coupled to the optical surface 104 to reduce by atomization the fluid droplet 102 from the second droplet size 102*b* to the third droplet size 102*c*.

In the example of FIG. 1, a circuitry controller 116 can be coupled with an input 118*a*, 120*a* of the first amplifier 108*a* to generate a first signal at an input 122*a* of ultrasonic transducer 106. The first signal at the input 122*a* of the ultrasonic transducer 106 includes a first frequency within the first resonant frequency band of the ultrasonic transducer 106 mechanically coupled to the optical surface 104. In some examples, the first frequency of the first signal can be a first sweep of frequencies (e.g., a first frequency sweep) within the first resonant frequency band of the ultrasonic transducer 106 mechanically coupled to the optical surface 104. Filter activation (and deactivation), as well as activation (and deactivation) of the ultrasonic transducer 106, can be carried out by filter switching circuitry 124, which is depicted in the drawings using stippled lines. For example, the filter switching circuitry 124 can be coupled between the circuitry controller 116 and the first filter 112*a* (e.g., first filter network 112*a*) to activate the first filter 112*a* (e.g. first filter network 112*a*) in response to a first control activation signal received from the circuitry controller 116 at an input 126 of the filter switching circuitry 124. For example, the filter switching circuitry 124 can include a first filter switch controller 128 having a first low side switch control output 128*a* and a first high side switch control output 128*b*. The first low side switch control output 128*a* of the first switch controller 128 can be coupled with a first low side switch 130*a* to control operation of the first low side switch 130*a*, for example, operation between a conducting or closed state of the first low side switch 130*a* and a non-conducting or open state of the first low side switch 130*a*. The first high side switch control output 128*b* can be coupled with a first high side switch 130*b* to control operation of the first high side switch 130*b*, for example, operation between a conducting or closed state of the first high side switch 130*b* and a non-conducting or open state of the first high switch 130*b*. As shown in the example of FIG. 1, the first low side switch 130*a* can be coupled between a ground reference and the first filter 112*a* (e.g., first filter network 112*a*.) As shown in the example of FIG. 1, the first high side switch 130*b* can be coupled between the first filter 112*a* (e.g., first filter network 112*a*) and input 122*a* of the ultrasonic transducer 106.

For example, first switch controller 128 can control both first low and high side switches 130*a*, 130*b* to be in a closed or conducting state, so as to activate the first filter 112*a* (e.g. first filter network 112*a*) in response to the first control activation signal received from the circuitry controller 116 at the input 126 of the filter switching circuitry 124. For example, first switch controller 128 can control both first low and high side switches 130*a*, 130*b* to be in the open or non-conducting state, so as to deactivate the first filter 112*a* (e.g. first filter network 112*a*) in response to a first control deactivation signal received from the circuitry controller 116 at the input 126 of the filter switching circuitry 124.

In the example of FIG. 1, the circuitry controller 116 can also be coupled with the input 118*a*, 120*a* of the first amplifier 108*a* to generate a second signal at the input 122*a* of ultrasonic transducer 106. The second signal at the input 122*a* of the ultrasonic transducer 106 includes a second frequency within the second resonant frequency band of the ultrasonic transducer 106 mechanically coupled to the optical surface 104. In some examples, the second frequency of the second signal can be a second sweep of frequencies (e.g., a second frequency sweep) within the second resonant frequency band of the ultrasonic transducer 106 mechanically coupled to the optical surface 104. In the example of FIG. 1, the filter switching circuitry 124 can be coupled between the circuitry controller 116 and the second filter 114*a* (e.g., second filter network 114*a*) to activate the second filter 114*a* (e.g. second filter network 114*a*) in response to a second control activation signal received from the circuitry controller 116 at the input 126 of the filter switching circuitry 124. For example, the filter switching circuitry 124 can include a second filter switch controller 138 having a second low side switch control output 138*a* and a second high side switch control output 138*b*. The second low side switch control output 138*a* of the second switch controller 138 can be coupled with a second low side switch 140*a* to control operation of the second low side switch 140*a*, for example, operation between a conducting or closed state of the second low side switch 140*a* and a non-conducting or open state of the second low side switch 140*a*. The second high side switch control output 138*b* can be coupled with a second high side switch 140*b* to control operation of the second high side switch 140*b*, for example, operation between a conducting or closed state of the second high side switch 140*b* and a non-conducting or open state of the second high switch 140*b*. As shown in the example of FIG. 1, the second low side switch 140*a* can be coupled between a ground reference and the second filter 114*a* (e.g., second filter network 114*a*.) As shown in the example of FIG. 1, the second high side switch 140*b* can be coupled between the second filter 114*a* (e.g., second filter network 114*a*) and input 122*a* of the ultrasonic transducer 106.

For example, second switch controller 138 can control both second low and high side switches 140*a*, 140*b* to be in a closed or conducting state, so as to activate the second filter 114*a* (e.g. second filter network 114*a*) in response to the second control activation signal received from the circuitry controller 116 at the input 126 of the filter switching circuitry 124. For example, second switch controller 138 can control both second low and high side switches 140*a*, 140*b* to be in the open or non-conducting state, so as to deactivate the second filter 114*a* (e.g. second filter network 114*a*) in response to a second control deactivation signal received from the circuitry controller 116 at the input 126 of the filter switching circuitry 124.

Also included in the example of FIG. 1 is a second amplifier 108*b* having a second amplifier output impedance 110*b*. The first additional filter 112*b* (e.g., first additional filter network 112*b*) is tuned (e.g., by its corresponding filter component values) within the first resonant frequency band to facilitate matching the second output impedance 110*b* of the second amplifier 108*b* with impedance of the ultrasonic transducer 106 mechanically coupled to the optical surface 104 and to reduce by atomization the fluid droplet 102 from a first droplet size 102*a* to a second droplet size 102*b*. The second additional filter 114*b* (e.g., second additional filter network 114*b*) is tuned (e.g., by its corresponding filter component values) within the second resonant frequency band to facilitate matching the second output impedance 110*b* of the second amplifier 108*b* with impedance of the ultrasonic transducer 106 mechanically coupled to the optical surface 104 and to reduce by atomization the fluid droplet 102 from the second droplet size 102*b* to the third droplet size 102*c*.

Also included in the example of FIG. 1 are a pair of ultrasonic transducer couplers 142*a*, 142*b* (e.g., connectors 142*a*, 142*b*). For example, electrodes of ultrasonic transducer 106 can be soldered to wires, which can be attached to a circuit board via connectors 142*a*, 142*b*. The pair of ultrasonic transducer couplers 142*a*, 142*b* can couple a bridge tied load including the ultrasonic transducer 106 between the first amplifier 108*a* and the second amplifier 108*b*. For example, the pair of ultrasonic transducer couplers 142*a*, 142*b* can couple the ultrasonic transducer 106 between the first amplifier 108*a* and the second amplifier 108*b* as the bridge tied load 108*b*. In addition to the first filter 112*a* (e.g. first filter network 112*a*), the example of FIG. 1 includes a first additional filter 112*b* (e.g. first additional filter network 112*b*.) The pair of ultrasonic transducer couplers 142*a*, 142*b* can couple the bridge tied load including the ultrasonic transducer 106 between the first filter 112*a* (e.g., first filter network 112*a*) and the first additional filter 112*b* (e.g., first additional filter network 112*b*.) For example, the pair of ultrasonic transducer couplers 142*a*, 142*b* can couple the ultrasonic transducer 106 between the first filter 112*a* (e.g., first filter network 112*a*) and the first additional filter 112*b* (e.g., first additional filter network 112*b*) as the bridge tied load 106.

The first filter 112*a* (e.g., first filter network 112*a*) and the first additional filter 112*b* (e.g., first additional filter network 112*b*) can be included in a first balanced filter 112*a*, 112*b*. The pair of ultrasonic transducer couplers 142*a*, 142*b* can be coupled between the first filter 112*a* (e.g., first filter network 112*a*) and the first additional filter 112*b* (e.g., first additional filter network 112*b*) in the first balanced filter 112*a*, 112*b* including the first filter 112*a* (e.g., first filter network 112*a*) and the first additional filter 112*b* (e.g., first additional filter network 112*b*.)

The first balanced filter 112*a*, 112*b* may be desired for its quality factor relative to quality factor of the first filter (e.g. first filter network 112*a*) alone. For example, the first filter network 112*a* can have a first filter network quality factor. The first balanced filter 112*a*, 112*b* including the first filter network 112*a* and the first additional filter network 112*b* can have a first balanced filter quality factor. The first balanced filter quality factor of the first balanced filter 112*a*, 112*b* can be greater than the first filter network quality factor of the first filter network 112*a*.

The first filter 112*a* can be matched pair tuned with the first additional filter 112*b* within the first resonant frequency band to facilitate matching the first output impedance 110*a* of the first amplifier 108*a* with impedance of the ultrasonic transducer 106 mechanically coupled to the optical surface 104 and to reduce by atomization the fluid droplet 102 from the first droplet size 102*a* to the second droplet size 102*b*.

Similarly, in addition to the second filter 114*a* (e.g. second filter network 114*a*), the example of FIG. 1 includes a second additional filter 114*b* (e.g. second additional filter network 112*b*.) The pair of ultrasonic transducer couplers 142*a*, 142*b* can couple the bridge tied load including the ultrasonic transducer 106 between the second filter 114*a* (e.g., second filter network 114*a*) and the second additional filter 114*b* (e.g., second additional filter network 114*b*.) For example, the pair of ultrasonic transducer couplers 142*a*, 142*b* can couple the ultrasonic transducer 106 between the second filter 114*a* (e.g., second filter network 114*a*) and the second additional filter 114*b* (e.g., second additional filter network 114*b*) as the bridge tied load 106.

The second filter 114*a* (e.g., second filter network 114*a*) and the second additional filter 114*b* (e.g., second additional filter network 114*b*) can be included in a second balanced filter 114*a*, 114*b*. The pair of ultrasonic transducer couplers 142*a*, 142*b* can be coupled between the second filter 114*a* (e.g., second filter network 114*a*) and the second additional filter 114*b* (e.g., second additional filter network 114*b*) in the second balanced filter 114*a*, 114*b* including the second filter 114*a*, (e.g., second filter network 114*a*) and the second additional filter 114*b* (e.g., second additional filter network 114*b*.)

Similar to what was discussed with respect to the first balanced filter 112*a*, 112*b*, the second balanced filter 114*a*, 114*b* may be desired for its quality factor relative to quality factor of the second filter (e.g. second filter network 114*a*) alone. For example, the second filter network 114*a* can have a second filter network quality factor. The second balanced filter 114*a*, 114*b* including the second filter network 114*a* and the second additional filter network 114*b* can have a second balanced filter quality factor. The second balanced filter quality factor of the second balanced filter 114*a*, 114*b* can be greater than the second filter network quality factor of the second filter network 114*a*.

The second filter 114*a* can be matched pair tuned with the second additional filter 114*b* within the second resonant frequency band to facilitate matching the first output impedance 110*a* of the first amplifier 108*a* with impedance of the ultrasonic transducer 106 mechanically coupled to the surface 104 and to reduce by atomization the fluid droplet from the second droplet size 102*b* to the third droplet size 102*c*.

In the example of FIG. 1, the circuitry controller 116 can be coupled with an additional input 118*b*, 120*b* of the second amplifier 108*b* to generate a first additional signal at an additional input 122*b* of ultrasonic transducer 106. The first additional signal at the additional input 122*b* of the ultrasonic transducer 106 includes the first frequency within the first resonant frequency band of the ultrasonic transducer 106 mechanically coupled to the optical surface 104. For example, the filter switching circuitry 124 can be coupled between the circuitry controller 116 and the first additional filter 112*b* (e.g., first additional filter network 112*b*) to activate the first additional filter 112*b* (e.g. first additional filter network 112*b*) in response to the first control activation signal received from the circuitry controller 116 at the input 126 of the filter switching circuitry 124. For example, the first filter switch controller 128 of the filter switching circuitry 124 can include having a first additional low side switch control output 128*c* and a first additional high side switch control output 128*d*. The first additional low side switch control output 128*c* of the first switch controller 128 can be coupled with a first additional low side switch 150*a* to control operation of the first additional low side switch 150*a*, for example, operation between a conducting or closed state of the first additional low side switch 150*a* and a non-conducting or open state of the first additional low side switch 150*a*. The first additional high side switch control output 128*d* can be coupled with a first additional high side switch 150*b* to control operation of the first additional high side switch 150*b*, for example, operation between a conducting or closed state of the first additional high side switch 150*b* and a non-conducting or open state of the first additional high switch 150*b*. As shown in the example of FIG. 1, the first additional low side switch 150*a* can be coupled between the ground reference and the first additional filter 112*b* (e.g., first additional filter network 112*b*.) As shown in the example of FIG. 1, the first additional high side switch 150*b* can be coupled between the first additional filter 112*b* (e.g., first additional filter network 112*b*) and additional input 122*b* of the ultrasonic transducer 106.

For example, first switch controller 128 can control both the first additional low side switch 150*a* and the first additional high side switch 150*b* to be in a closed or conducting state, so as to activate the first additional filter 112*b* (e.g. first additional filter network 112*b*) in response to the first control activation signal received from the circuitry controller 116 at the input 126 of the filter switching circuitry 124. At the same time, the first switch controller 128 can also control both first low and high side switches 130*a*, 130*b* to be in the closed or conducting state, so as to activate the first filter 112*a* (e.g. first filter network 112*a*) in response to the first control activation signal received from the circuitry controller 116 at the input 126 of the filter switching circuitry 124. Accordingly, in response to the first control activation signal received from the circuitry controller 116 at the input 126 of the filter switching circuitry 124, the first switch controller 128 can activate both the first filter 112*a* (e.g. first filter network 112*a*) and the first additional filter 112*b* (e.g. first additional filter network 112*b*.) Moreover, since the first balanced filter 112*a*, 112*b* can include both the first filter 112*a* (e.g., first filter network 112*a*) and the first additional filter network 112*b* (e.g. first additional filter network 112*b*), in response to the first control activation signal received from the circuitry controller 116 at the input 126 of the filter switching circuitry 124, the first switch controller 128 can activate the first balanced filter 112*a*, 112*b*.

For example, first switch controller 128 can control both the first additional low side switch 150*a* and the first additional high side switch 150*b* to be in an open or non-conducting state, so as to deactivate the first additional filter 112*b* (e.g. first additional filter network 112*b*) in response to the first control deactivation signal received from the circuitry controller 116 at the input 126 of the filter switching circuitry 124. At the same time, the first switch controller 128 can also control both first low and high side switches 130*a*, 130*b* to be in the open or non-conducting state, so as to deactivate the first filter 112*a* (e.g. first filter network 112*a*) in response to the first control deactivation signal received from the circuitry controller 116 at the input 126 of the filter switching circuitry 124. Accordingly, in response to the first control deactivation signal received from the circuitry controller 116 at the input 126 of the filter switching circuitry 124, the first switch controller 128 can deactivate both the first filter 112*a* (e.g. first filter network 112*a*) and the first additional filter 112*b* (e.g. first additional filter network 112*b*.) Moreover, since the first balanced filter 112*a*, 112*b* can include both the first filter 112*a* (e.g., first filter network 112*a*) and the first additional filter network 112*b* (e.g. first additional filter network 112*b*), in response to the first control deactivation signal received from the circuitry controller 116 at the input 126 of the filter switching circuitry 124, the first switch controller 128 can deactivate the first balanced filter 112*a*, 112*b*.

In the example of FIG. 1, the circuitry controller 116 can also be coupled with the additional input 118*b*, 120*b* of the second amplifier 108*b* to generate a second additional signal at the additional input 122*b* of ultrasonic transducer 106. The second additional signal at the additional input 122*b* of the ultrasonic transducer 106 includes the second frequency within the second resonant frequency band of the ultrasonic transducer 106 mechanically coupled to the optical surface 104. For example, the filter switching circuitry 124 can be coupled between the circuitry controller 116 and the second additional filter 114*b* (e.g., second additional filter network 114*b*) to activate the second additional filter 114*b* (e.g. second additional filter network 114*b*) in response to the second control activation signal received from the circuitry controller 116 at the input 126 of the filter switching circuitry 124. For example, the second filter switch controller 138 of the filter switching circuitry 124 can include a second additional low side switch control output 138*c* and a second additional high side switch control output 138*d*. The second additional low side switch control output 138*c* of the second switch controller 138 can be coupled with a second additional low side switch 160*a* to control operation of the second additional low side switch 160*a*, for example, operation between a conducting or closed state of the second additional low side switch 160*a* and a non-conducting or open state of the second additional low side switch 160*a*. The second high side switch control output 138*d* can be coupled with a second additional high side switch 160*b* to control operation of the second additional high side switch 160*b*, for example, operation between a conducting or closed state of the second additional high side switch 160*b* and a non-conducting or open state of the second additional high switch 160*b*.

As shown in the example of FIG. 1, the second additional low side switch 160*a* can be coupled between the ground reference and the second additional filter 114*b* (e.g., second additional filter network 114*b*.) As shown in the example of FIG. 1, the second additional high side switch 160*b* can be coupled between the second additional filter 114*b* (e.g., second additional filter network 114*b*) and additional input 122*b* of the ultrasonic transducer 106. For example, second switch controller 138 can control both the second additional low side switch 160*a* and the second additional high side switch 160*b* to be in a closed or conducting state, so as to activate the second additional filter 114*b* (e.g. second additional filter network 114*b*) in response to the second control activation signal received from the circuitry controller 116 at the input 126 of the filter switching circuitry 124. At the same time, the second switch controller 138 can also control both second low and high side switches 140*a*, 140*b* to be in the closed or conducting state, so as to activate the second filter 114*a* (e.g. second filter network 112*b*) in response to the second control activation signal received from the circuitry controller 116 at the input 126 of the filter switching circuitry 124. Accordingly, in response to the second control activation signal received from the circuitry controller 116 at the input 126 of the filter switching circuitry 124, the second switch controller 138 can activate both the second filter 114*a* (e.g. second filter network 114*a*) and the second additional filter 114*b* (e.g. second additional filter network 114*b*.) Moreover, since the second balanced filter 114*a*, 114*b* can include both the second filter 114*a* (e.g., second filter network 112*a*) and the second additional filter network 114*b* (e.g. second additional filter network 114*b*), in response to the second control activation signal received from the circuitry controller 116 at the input 126 of the filter switching circuitry 124, the second switch controller 138 can activate the second balanced filter 114*a*, 114*b*.

For example, second switch controller 138 can control both the second additional low side switch 160*a* and the second additional high side switch 160*b* to be in an open or non-conducting state, so as to deactivate the second additional filter 114*b* (e.g. second additional filter network 114*b*) in response to the second control deactivation signal received from the circuitry controller 116 at the input 126 of the filter switching circuitry 124. At the same time, the second switch controller 138 can also control both second low and high side switches 140*a*, 140*b* to be in the open or non-conducting state, so as to deactivate the second filter 114*a* (e.g. second filter network 114*b*) in response to the second control deactivation signal received from the circuitry controller 116 at the input 126 of the filter switching circuitry 124. Accordingly, in response to the second control deactivation signal received from the circuitry controller 116 at the input 126 of the filter switching circuitry 124, the second switch controller 138 can deactivate both the second filter 114*a* (e.g. second filter network 114*a*) and the second additional filter 114*b* (e.g. second additional filter network 114*b*.) Moreover, since the second balanced filter 114*a*, 114*b* can include both the second filter 114*a* (e.g., second filter network 114*a*) and the second additional filter network 114*b* (e.g. second additional filter network 114*b*), in response to the second control deactivation signal received from the circuitry controller 116 at the input 126 of the filter switching circuitry 124, the second switch controller 138 can deactivate the second balanced filter 114*a*, 114*b*.

As shown in the example of FIG. 1, the optical surface 104 can be oriented within a gravitational field so that a component of the gravitational field that is tangential to the surface 104 (e.g., as depicted for by downward arrow tangential to surface 104) operates upon the fluid droplet 102. This orientation can be achieved, for example, while activating the ultrasonic transducer 106 that is mechanically coupled to the optical surface 104 to expel fluid of the fluid droplet 102 from the optical surface. For example, the foregoing orienting of the optical surface 104 can be orienting the optical surface 104 within the gravitational field so that the component of the gravitational field that is tangential to the optical surface 104 is greater than a component of the gravitation field that is normal into the optical surface 104.

As mentioned previously, in the example of FIG. 1 filter activation (and deactivation), as well as activation (and deactivation) of the ultrasonic transducer 106, can be carried out by filter switching circuitry 124, which is depicted in the drawings using stippled lines. For example, the filter switching circuitry 124 can be coupled between the circuitry controller 116 and the first filter 112*a* (e.g., first filter network 112*a*) to activate the first filter 112*a* (e.g. first filter network 112*a*) in response to a first control activation signal received from the circuitry controller 116 at an input 126 of the filter switching circuitry 124. Similarly, at the same time, the filter switching circuitry 124 can be coupled between the circuitry controller 116 and the first additional filter 112*b* (e.g., first additional filter network 112*b*) to activate the first additional filter 112*b* (e.g. first additional filter network 112*b*) in response to the first control activation signal received from the circuitry controller 116 at the input 126 of the filter switching circuitry 124.

As shown in the example of FIG. 1, the circuitry controller 116 can be coupled with the input 118*a*, 120*a* of the first amplifier 108*a* to generate the first signal at the input 122*a* of ultrasonic transducer 106. Similarly, at the same time, the circuitry controller 116 can be coupled with the additional input 118*b*, 120*b* of the second amplifier 108*b* to generate the first additional signal at the additional input 122*b* of ultrasonic transducer 106. The first signal at the input 122*a* of the ultrasonic transducer 106 includes the first frequency within the first resonant frequency band of the ultrasonic transducer 106 mechanically coupled to the optical surface 104. Similarly, as already discussed, the first additional signal at the additional input 122*b* of the ultrasonic transducer 106 likewise can include the first frequency within the first resonant frequency band of the ultrasonic transducer 106 mechanically coupled to the optical surface 104. The first signal and the first additional signal can be antiphase (e.g., one-hundred-and-eighty degrees out of phase) with one another.

The circuitry controller 116 can begin ramping up the amplitude of the first signal at the ultrasonic transducer 106 from a predetermined initial amplitude level of the first signal to a predetermined full amplitude level of the first signal. At the same time, in a similarly way, circuitry controller 116 can also begin ramping up the amplitude of the first additional signal at the ultrasonic transducer 106 from a predetermined initial amplitude level of the first additional signal to a predetermined full amplitude level of the first additional signal.

For example, respective amplitudes of the first signal and the first additional signal can be ramped up (e.g., increased) by the circuitry controller 116 from their respective predetermined initial amplitude levels to their respective predetermined full amplitude levels at a predetermined ramp up rate. For example, the circuitry controller 116 can begin ramping up (e.g., increasing) respective amplitudes of the first signal and the first additional signal at the predetermined ramp up rate. The circuitry controller 116 can continue ramping up respective amplitudes of the first signal and the first additional signal at the predetermined ramp up rate, by increasing respective amplitudes of the first signal and first additional signal, while respective predetermined full amplitude levels of the first signal and the first additional signal have not yet been reached. Because the circuitry controller 116 can control and/or increase and/or set the respective amplitudes of the first signal and first additional signal, the circuitry controller 116 can determine that ramping up of the first signal and the first additional signal is finished. For example, as the circuitry controller 116 is finishing ramping up, the circuitry controller 116 can control and/or increase and/or set the respective amplitudes of the first signal and first additional signal to their respective predetermined full amplitude levels. For example, after the circuitry controller 116 controls and/or increases and/or sets the respective amplitudes of the first signal and first additional signal to their respective predetermined full amplitude levels, the circuitry controller 116 can determine that ramping up (e.g. increasing amplitude of the first signal and first additional signal) is finished.

In another example of ramping up, an amplitude sensor 162 can include an analog differential amplifier that can differentially sense voltage across the input 122*a* and the additional input 122*b* of the ultrasonic transducer 106. The voltage differentially sensed by the analog differential amplifier across the input 122*a* and the additional input 122*b* of the ultrasonic transducer 106 is indicative of respective amplitudes of the first signal and the first additional signal in antiphase with one another. The first signal and the first additional signal can be ramped up by the circuitry controller 116 from their respective predetermined initial amplitude levels to their respective predetermined full amplitude levels at a predetermined ramp up rate. For example, the circuitry controller 116 can begin ramping up the first signal and the first additional signal at the predetermined ramp up rate. The circuitry controller 116 can continue ramping up the first signal and the first additional signal at the predetermined ramp up rate, by increasing respective amplitudes of the first signal and first additional signal, while respective predetermined full amplitude levels of the first signal and the first additional signal have not yet been reached. For example, as the circuitry controller 116 is finishing ramping up, the circuitry controller 116 can use the analog differential amplifier in differentially sensing the voltage across the input 122*a* and the additional input 122*b* of the ultrasonic transducer. This measurement can be the first sensed amplitude 164*a* and can be indicative of respective amplitudes of the first signal and the first additional signal in antiphase with one another. In this example, the amplitude comparator 166 can compare the first sensed amplitude 164*a* to the ascending target amplitude 168*a*, for example, to determine whether the first sensed amplitude 164*a* satisfies the ascending target amplitude 168*a* for the first signal and the first additional signal. For example, when the amplitude comparator 166 determines that the first sensed amplitude 164*a* is below the ascending target amplitude 168*a*, the amplitude comparator 166 can determine that the first sensed amplitude 164*a* does not satisfy the ascending target amplitude 168*a* for the first signal and the first additional signal. The circuitry controller 116 can adjust to increase respective amplitudes of the first signal and the first additional signal based on the first sensed amplitude 164*a*. For example, the circuitry controller 116 can adjust to increase amplitude of the first signal and the first additional signal based on the amplitude comparator 166 determining that the first sensed amplitude 164*a* does not satisfy the ascending target amplitude 168*a*. The ascending target amplitude 168*a* can be based on the respective predetermined full amplitude levels of the first signal and the first additional signal, so that the circuitry controller 116 can adjust to increase respective amplitudes of the first signal and the first additional signal to the predetermined full amplitude levels.

The circuitry controller 116 can then use the analog differential amplifier in differentially sensing the voltage across the input 122*a* and the additional input 122*b* of the ultrasonic transducer, so as to determine a second sensed amplitude 170*a* of the first signal and the first additional signal. The amplitude comparator 166 can compare the second sensed amplitude 170*a* of the first signal and the first additional signal to the ascending target amplitude 168*a*, for example, to determine whether the second sensed amplitude 170*a* of the first signal and the first additional signal satisfies the ascending target amplitude 168*a*. For example, when the amplitude comparator 166 determines that the second sensed amplitude 170*a* of the first signal and the first additional signal meets, or for example exceeds the ascending target amplitude 168*a*, the amplitude comparator 166 can determine that the second sensed amplitude 170*a* of the first signal and the first additional signal satisfies the ascending target amplitude 168*a*. For example, when the amplitude comparator 166 determines that the second sensed amplitude 170*a* of the first signal and the first additional signal satisfies the ascending target amplitude 168*a*, the circuitry controller 116 can determine that increasing the amplitude of the first signal and the first additional signal is finished. For example, since the ascending target amplitude 168*a* can be based on the respective predetermined full amplitude levels of first signal and the first additional signal, the circuitry controller 116 can determine that respective amplitudes of the first signal and the first additional signal have been increased to reach the predetermined full amplitude levels of first signal and the first additional signal. This comparison can determine that ramping up, and increasing the amplitude of the first signal and first additional signal, is finished. Similarly, in case of overshooting the ascending target amplitude 168*a*, the circuitry controller 116 can then use the analog differential amplifier in differentially sensing the voltage across the input 122*a* and the additional input 122*b* of the ultrasonic transducer, so as to determine decreasing the amplitude of the first signal and the first additional signal to match the ascending target amplitude 168*a*.

Ramping up the respective amplitudes of the first signal and the first additional signal, as just discussed in various prior examples, can facilitate activating the ultrasonic transducer 106 at the first frequency within the first resonant frequency band of the ultrasonic transducer. For example, by coupling the first signal and the first additional signal, the fluid droplet 102 can be reduced by atomization from the first droplet size 102*a* to the second droplet size 102*b*. Thereafter, the circuitry controller 116 can begin limiting the first signal and the first additional signal by ramping down the respective amplitudes of the first signal and the first additional signal at ultrasonic transducer from the respective predetermined full amplitude levels of the first signal and the first additional signal to the respective predetermined reduced levels of the first signal and the first additional signal.

For example, respective amplitudes of the first signal and the first additional signal can be ramped down (e.g., decreased) by the circuitry controller 116 from their respective predetermined full amplitude levels to their respective predetermined reduced amplitude levels at a predetermined ramp down rate. For example, the circuitry controller 116 can begin ramping down (e.g., decreasing) respective amplitudes of the first signal and the first additional signal at the predetermined ramp down rate. The circuitry controller 116 can continue ramping down respective amplitudes of the first signal and the first additional signal at the predetermined ramp down rate, by decreasing respective amplitudes of the first signal and first additional signal, while respective predetermined reduced amplitude levels of the first signal and the first additional signal have not yet been reached. Because the circuitry controller 116 can control and/or decrease and/or set the respective amplitudes of the first signal and first additional signal, the circuitry controller 116 can determine that ramping down of the first signal and the first additional is finished. For example, as the circuitry controller 116 is finishing ramping down, the circuitry controller 116 can control and/or decrease and/or set the respective amplitudes of the first signal and first additional signal to their respective predetermined reduced amplitude levels. For example, after the circuitry controller 116 controls and/or decreases and/or sets the respective amplitudes of the first signal and first additional signal to their respective predetermined reduced amplitude levels, the circuitry controller 116 can determine that ramping down (e.g. decreasing amplitude of the first signal and first additional signal) is finished.

In another example of ramping down, the amplitude sensor 162 can include an analog differential amplifier that can differentially sense voltage across the input 122*a* and the additional input 122*b* of the ultrasonic transducer 106. The voltage differentially sensed by the analog differential amplifier across the input 122*a* and the additional input 122*b* of the ultrasonic transducer 106 is indicative of the respective amplitudes of the first signal and the first additional signal in antiphase with one another. The first signal and the first additional signal can be ramped down by the circuitry controller 116 from their respective predetermined full amplitude levels to their respective predetermined reduced amplitude levels at a predetermined ramp down rate. For example, the circuitry controller 116 can begin ramping down the first signal and the first additional signal at the predetermined ramp down rate. The circuitry controller 116 can continue ramping down the first signal and the first additional signal at the predetermined ramp down rate, by decreasing respective amplitudes of the first signal and first additional signal, while respective predetermined reduced amplitude levels of the first signal and the first additional signal have not yet been reached. For example, as the circuitry controller 116 is finishing ramping down, the circuitry controller 116 can use the analog differential amplifier in differentially sensing the voltage across the input 122*a* and the additional input 122*b* of the ultrasonic transducer. This measurement can be the first sensed amplitude 164*a* and can be indicative of respective amplitudes of the first signal and the first additional signal in antiphase with one another. In this example, the amplitude comparator 166 can compare the first sensed amplitude 164*a* to the descending target amplitude 168*a*, for example, to determine whether the first sensed amplitude 164*a* satisfies the descending target amplitude 168*a* for the first signal and the first additional signal. For example, when the amplitude comparator 166 determines that the first sensed amplitude 164*a* is above the descending target amplitude 168*a*, the amplitude comparator 166 can determine that the first sensed amplitude 164*a* does not satisfy the descending target amplitude 168*a* for the first signal and the first additional signal. The circuitry controller 116 can adjust to decrease respective amplitudes of the first signal and the first additional signal based on the first sensed amplitude 164*a*. For example, the circuitry controller 116 can adjust to decrease amplitude of the first signal and the first additional signal based on the amplitude comparator 166 determining that the first sensed amplitude 164*a* does not satisfy the descending target amplitude 168*a*. The descending target amplitude 168*a* can be based on the respective predetermined reduced amplitude levels of the first signal and the first additional signal, so that the circuitry controller 116 can adjust to decrease respective amplitudes of the first signal and the first additional signal to the predetermined reduced amplitude levels.

The circuitry controller 116 can then use the analog differential amplifier in differentially sensing the voltage across the input 122*a* and the additional input 122*b* of the ultrasonic transducer, so as to determine a second sensed amplitude 170*a* of the first signal and the first additional signal. The amplitude comparator 166 can compare the second sensed amplitude 170*a* of the first signal and the first additional signal to the descending target amplitude 168*a*, for example, to determine whether the second sensed amplitude 170*a* of the first signal and the first additional signal satisfies the descending target amplitude 168*a*. For example, when the amplitude comparator 166 determines that the second sensed amplitude 170*a* of the first signal and the first additional signal meets, or, for example, is below the descending target amplitude 168*a*, the amplitude comparator 166 can determine that the second sensed amplitude 170*a* of the first signal and the first additional signal satisfies the descending target amplitude 168*a*. For example, when the amplitude comparator 166 determines that the second sensed amplitude 170*a* of the first signal and the first additional signal satisfies the descending target amplitude 168*a*, the circuitry controller 116 can determine that decreasing the amplitude of the first signal and the first additional signal is finished. For example, since the descending target amplitude 168*a* can be based on the respective predetermined reduced amplitude levels of first signal and the first additional signal, the circuitry controller 116 can determine that respective amplitudes of the first signal and the first additional signal have been decreased to reach the predetermined reduced amplitude levels of first signal and the first additional signal. This comparison can determine that ramping down, and decreasing the amplitude of the first signal and first additional signal, is finished. Similarly, in case of overshooting the descending target amplitude 168*b*, the circuitry controller 116 can then use the analog differential amplifier in differentially sensing the voltage across the input 122*a* and the additional input 122*b* of the ultrasonic transducer, so as to determine increasing the amplitude of the first signal and the first additional signal to match the descending target amplitude 168*b*.

As just discussed in the various prior examples, the circuitry controller 116 can limit the first signal and the first additional signal by ramping down the respective amplitudes of the first signal and the first additional signal at ultrasonic transducer from the respective predetermined full amplitude levels of the first signal and the first additional signal to the respective predetermined reduced levels of the first signal and the first additional signal. Thereafter, the circuitry controller 116 can begin determining when to deactivate the first filter 112*a* (and the first additional filter 112*b*) and the ultrasonic transducer 106 based on sensing a first current transient of the ultrasonic transducer 106. As shown for example in FIG. 1, an ultrasonic transducer current sensor 172 can be coupled to the ultrasonic transducer 106 to sense current transients, for example, to sense the first current transient of the ultrasonic transducer. For example, the ultrasonic transducer current sensor 172 can include an AC level detector. For example, the AC level detector can include a rectifier followed by a low-pass filter. In another example, the AC level detector can take a maximum value over a time window which is at least one electrical period long.

The ultrasonic transducer current sensor 172 can sense current, for example, to determine a first current sensing 174 of a first current transient of the ultrasonic transducer 106. For example, the circuitry controller 116 can include a current transient comparator 176 to compare the first current sensing 174 of the first current transient of the ultrasonic transducer 106 to a current transient threshold 178, for example, to determine whether the first current sensing 174 of the first current transient of the ultrasonic transducer 106 satisfies the current transient threshold 178. For example, when the current transient comparator 176 determines that the first current sensing 174 of the first current transient of the ultrasonic transducer 106 is above the current transient threshold 178, the current transient comparator 176 can determine that the first current sensing 174 of the first current transient of the ultrasonic transducer 106 does not satisfy the current transient threshold 178. The circuitry controller 116 can delay deactivating the first filter 112*a* (and the first additional filter 112*b*) and delay deactivating the ultrasonic transducer 106 based on the ultrasonic transducer current sensor 172 sensing the first current transient of the ultrasonic transducer 106. For example, the circuitry controller 116 can delay deactivating the first filter 112*a* (and the first additional filter 112*b*) and delay deactivating the ultrasonic transducer 106 based on the current transient comparator 176 determining that the first current sensing 174 of the first current transient of the ultrasonic transducer 106 does not satisfy the current transient threshold 178. The current transient threshold 178 can be based on a predetermined reduced current transient of the ultrasonic transducer 106, so that the circuitry controller 116 can delay until the current of the ultrasonic transducer 106 reaches the predetermined reduced current transient of the ultrasonic transducer 106. The predetermined reduced current transient of the ultrasonic transducer 106 can be a zero current transient, or a near zero current transient.

The circuitry controller 116 can also determine whether delaying the deactivation of the first filter 112*a* (and the first additional filter 112*b*) and delaying the deactivation of the ultrasonic transducer 106 is finished. The ultrasonic transducer current sensor 172 that can sense current of the ultrasonic transducer 106, for example, can determine a second current sensing 180 of the first current transient of the ultrasonic transducer 106. The current transient comparator 176 can compare the second current sensing 180 of the first current transient of the ultrasonic transducer 106 to the current transient threshold 178, for example, to determine whether the second current sensing 180 of the first current transient of the ultrasonic transducer 106 satisfies the current transient threshold 178. For example, when the current transient comparator 176 determines that the second current sensing 180 of the first current transient of the ultrasonic transducer 106 meets, or for example is lower than the current transient threshold 178, the current transient comparator 176 can determine that the second current sensing 180 of the first current transient of the ultrasonic transducer 106 satisfies the current transient threshold 178. For example, when the current transient comparator 176 determines that second current sensing 180 of the first current transient of the ultrasonic transducer 106 satisfies the current transient threshold 178, the circuitry controller 116 can determine that delaying the deactivation of the first filter 112*a* (and the first additional filter 112*b*) and delaying the deactivation of the ultrasonic transducer 106 is finished. For example, since the current transient threshold 178 can be based on the predetermined reduced current transient, the circuitry controller 116 can determine that the first current transient of the ultrasonic transducer 106 has been reduced to reach the predetermined reduced current transient, and so can determine that delaying the deactivation of the first filter 112*a* (and the first additional filter 112*b*) and delaying the deactivation of the ultrasonic transducer 106 is finished.

In the examples just discussed, ultrasonic transducer current sensor 172 can be employed in determining whether delaying the deactivation of the first filter 112*a* (and the first additional filter 112*b*) and delaying the deactivation of the ultrasonic transducer 106 is finished. However, in simpler examples, ultrasonic transducer current sensor 172 may not be needed. In a simpler example, circuitry controller 116 can determine that delaying the deactivation of the first filter 112*a* (and the first additional filter 112*b*) and delaying the deactivation of the ultrasonic transducer 106 is finished by using timer 182. For example, timer 182 can determine when a predetermined prior time period has elapsed, prior to deactivating the first filter 112*a* (and the first additional filter 112*b*) and deactivating the ultrasonic transducer 106. The predetermined prior time period can be selected to provide sufficient time for the current transient to die down to a sufficiently reduced current transient level.

For example, after finishing ramping down the respective amplitudes of the first signal and the first additional signal, the circuitry controller 116 can start timer 182 to measure elapsed time. After the timer 182 determines that the predetermined prior time period has elapsed, the circuitry controller 116 can determine to deactivate the first filter 112*a* (and the first additional filter 112*b*) and deactivate the ultrasonic transducer 106. After the timer 182 determines that the predetermined prior time period has elapsed, the circuitry controller 116 can determine that delaying the deactivation of the first filter 112*a* (and the first additional filter 112*b*) and delaying the deactivation of the ultrasonic transducer 106 is finished.

After the circuitry controller 116 determines that delaying the deactivation of the first filter 112*a* (and the first additional filter 112*b*) and delaying the deactivation of the ultrasonic transducer 106 is finished, the circuitry controller 116 can control the filter switching circuitry 124 to deactivate the first filter 112*a* (and the first additional filter 112*b*) and deactivate the ultrasonic transducer 106. Further, the circuitry controller 116 can use, for example, timer 182 to delay a predetermined period of time after deactivating the first filter 112*a* (and the first additional filter 112*b*) and deactivating the ultrasonic transducer 106. Additionally, after delaying the predetermined period of time after deactivating the first filter 112*a* (and the first additional filter 112*b*) and deactivating the ultrasonic transducer 106, the circuitry controller can then activate the second filter 114*a* (and the second additional filter 114*b*) and activate the ultrasonic transducer 106.

For example, the filter switching circuitry 124 can be coupled between the circuitry controller 116 and the second filter 114*a* (e.g., second filter network 114*a*) to activate the second filter 114*a* (e.g. second filter network 114*a*) in response to the second control activation signal received from the circuitry controller 116 at the input 126 of the filter switching circuitry 124. Similarly, at the same time, the filter switching circuitry 124 can be coupled between the circuitry controller 116 and the second additional filter 114*b* (e.g., second additional filter network 114*b*) to activate the second additional filter 114*b* (e.g. second additional filter network 114*b*) in response to the second control activation signal received from the circuitry controller 116 at the input 126 of the filter switching circuitry 124.

As shown in the example of FIG. 1, the circuitry controller 116 can be coupled with the input 118*a*, 120*a* of the first amplifier 108*a* to generate the second signal at the input 122*a* of ultrasonic transducer 106. Similarly, at the same time, the circuitry controller 116 can be coupled with the additional input 118*b*, 120*b* of the second amplifier 108*b* to generate the second additional signal at the additional input 122*b* of ultrasonic transducer 106. The second signal at the input 122*a* of the ultrasonic transducer 106 includes the second frequency within the second resonant frequency band of the ultrasonic transducer 106 mechanically coupled to the optical surface 104. Similarly, as already discussed, the second additional signal at the additional input 122*b* of the ultrasonic transducer 106 likewise can include the second frequency within the second resonant frequency band of the ultrasonic transducer 106 mechanically coupled to the optical surface 104. The second signal and the second additional signal can be antiphase (e.g., one-hundred-and-eighty degrees out of phase) with one another.

The circuitry controller 116 can begin ramping up the amplitude of the second signal at the ultrasonic transducer 106 from a predetermined initial amplitude level of the second signal to a predetermined full amplitude level of the second signal. At the same time, in a similarly way, circuitry controller 116 can also begin ramping up the amplitude of the second additional signal at the ultrasonic transducer 106 from a predetermined initial amplitude level of the second additional signal to a predetermined full amplitude level of the second additional signal.

While various examples of ramping up the amplitude of the first signal and the first additional signal have already been discussed in detail previously herein, amplitude of the second signal and the second additional signal can be ramped up by the circuitry controller 116 in similar ways. Accordingly, application of these previously discussed ramping up examples to ramping up the amplitude of the second signal and the second additional signal is not discussed in detail here. Instead, the reader is directed to the previously discussed ramping up examples, and directed to apply the previously discussed ramping up examples to ramping up the amplitude of the second signal and the second additional signal.

Ramping up the respective amplitudes of the second signal and the second additional signal, as just discussed, can facilitate activating the ultrasonic transducer at the second frequency within the second resonant frequency band of the ultrasonic transducer, for example, by coupling the second signal and the second additional signal to reduce the fluid droplet 102 by atomization from the second droplet size 102*b* to the third droplet size 102*c*. Thereafter, the circuitry controller 116 can begin limiting the second signal and the second additional signal by ramping down the respective amplitudes of the second signal and the second additional signal at ultrasonic transducer from the respective predetermined full amplitude levels of the second signal and the second additional signal to the respective predetermined reduced levels of the second signal and the second additional signal.

While various examples of ramping down amplitude of the first signal and the first additional signal have already been discussed in detail previously herein, amplitude of the second signal and the second additional signal can be ramped down by the circuitry controller 116 in similar ways. Accordingly, application of these previously discussed ramping down examples to ramping down amplitude of the second signal and the second additional signal is not discussed in detail here. Instead, the reader is directed to the previously discussed ramping down examples, and directed to apply the previously discussed ramping down examples to ramping down amplitude of the second signal and the second additional signal.

As just discussed, the circuitry controller 116 can limit the second signal and the second additional signal by ramping down the respective amplitudes of the second signal and the second additional signal at ultrasonic transducer from the respective predetermined full amplitude levels of the second signal and the second additional signal to the respective predetermined reduced levels of the second signal and the second additional signal. Thereafter, the circuitry controller 116 can begin determining when to deactivate the second filter 114*a* (and the second additional filter 114*b*) and the ultrasonic transducer 106 based on sensing a second current transient of the ultrasonic transducer 106. As shown for example in FIG. 1, the ultrasonic transducer current sensor 172 can be coupled to the ultrasonic transducer 106 to sense current transients, for example, to sense the second current transient of the ultrasonic transducer.

The ultrasonic transducer current sensor 172 can sense current, for example, to determine a first current sensing 174 of the second current transient of the ultrasonic transducer 106. For example, the circuitry controller 116 can include a current transient comparator 176 to compare the first current sensing 174 of the second current transient of the ultrasonic transducer 106 to the current transient threshold 178, for example, to determine whether the first current sensing 174 of the second current transient of the ultrasonic transducer 106 satisfies the current transient threshold 178. For example, when the current transient comparator 176 determines that the first current sensing 174 of the second current transient of the ultrasonic transducer 106 is above the current transient threshold 178, the current transient comparator 176 can determine that the first current sensing 174 of the second current transient of the ultrasonic transducer 106 does not satisfy the current transient threshold 178. The circuitry controller 116 can delay deactivating the second filter 114*a* (and the second additional filter 114*b*) and delay deactivating the ultrasonic transducer 106 based on the ultrasonic transducer current sensor 172 sensing the second current transient of the ultrasonic transducer 106. For example, the circuitry controller 116 can delay deactivating the second filter 114*a* (and the second additional filter 114*b*) and delay deactivating the ultrasonic transducer 106 based on the current transient comparator 176 determining that the first current sensing 174 of the second current transient of the ultrasonic transducer 106 does not satisfy the current transient threshold 178. The current transient threshold 178 can be based on the predetermined reduced current transient of the ultrasonic transducer 106, so that the circuitry controller 116 can delay until the current of the ultrasonic transducer 106 reaches the predetermined reduced current transient of the ultrasonic transducer 106. As already mentioned, the predetermined reduced current transient of the ultrasonic transducer 106 can be the zero current transient, or the near zero current transient.

The circuitry controller 116 can also determine whether delaying the deactivation of the second filter 114*a* (and the second additional filter 114*b*) and delaying the deactivation of the ultrasonic transducer 106 is finished. The ultrasonic transducer current sensor 172 that can sense current of the ultrasonic transducer 106, for example, can determine a second current sensing 180 of the second current transient of the ultrasonic transducer 106. The current transient comparator 176 can compare the second current sensing 180 of the second current transient of the ultrasonic transducer 106 to the current transient threshold 178, for example, to determine whether the second current sensing 180 of the second current transient of the ultrasonic transducer 106 satisfies the current transient threshold 178. For example, when the current transient comparator 176 determines that the second current sensing 180 of the second current transient of the ultrasonic transducer 106 meets, or, for example, is lower than the current transient threshold 178, the current transient comparator 176 can determine that the second current sensing 180 of the second current transient of the ultrasonic transducer 106 satisfies the current transient threshold 178. For example, when the current transient comparator 176 determines that the second current sensing 180 of the second current transient of the ultrasonic transducer 106 satisfies the current transient threshold 178, the circuitry controller 116 can determine that delaying the deactivation of the second filter 114*a* (and the second additional filter 114*b*) and delaying the deactivation of the ultrasonic transducer 106 is finished. For example, since the current transient threshold 178 can be based on the predetermined reduced current transient, the circuitry controller 116 can determine that the second current transient of the ultrasonic transducer 106 has been reduced to reach the predetermined reduced current transient, and so can determine that delaying the deactivation of the second filter 114*a* (and the second additional filter 114*b*) and delaying the deactivation of the ultrasonic transducer 106 is finished.

In the examples just discussed, ultrasonic transducer current sensor 172 can be employed in determining whether delaying the deactivation of the second filter 114*a* (and the second additional filter 114*b*) and delaying the deactivation of the ultrasonic transducer 106 is finished. However, in simpler examples, ultrasonic transducer current sensor 172 may not be needed. In a simpler example, circuitry controller 116 can determine that delaying the deactivation of the second filter 114*a* (and the second additional filter 114*b*) and delaying the deactivation of the ultrasonic transducer 106 is finished by using timer 182. For example, timer 182 can determine when a predetermined prior time period has elapsed, prior to deactivating the second filter 114*a* (and the second additional filter 114*b*) and deactivating the ultrasonic transducer 106. The predetermined prior time period can be selected to provide sufficient time for the current transient to die down to a sufficiently reduced current transient level.

For example, after finishing ramping down the respective amplitudes of the second signal and the second additional signal, the circuitry controller 116 can start timer 182 to measure elapsed time. After the timer 182 determines that the predetermined prior time period has elapsed, the circuitry controller 116 can determine to deactivate the second filter 114*a* (and the second additional filter 114*b*) and deactivate the ultrasonic transducer 106. After the timer 182 determines that the predetermined prior time period has elapsed, the circuitry controller 116 can determine that delaying the deactivation of the second filter 114*a* (and the second additional filter 114*b*) and delaying the deactivation of the ultrasonic transducer 106 is finished.

After the circuitry controller 116 determines that delaying the deactivation of the second filter 114*a* (and the second additional filter 114*b*) and delaying the deactivation of the ultrasonic transducer 106 is finished, the circuitry controller 116 can control the filter switching circuitry to deactivate the second filter 114*a* (and the second additional filter 114*b*) and deactivate the ultrasonic transducer 106. Further, the circuitry controller 116 can use, for example, timer 182 to delay the predetermined period of time after deactivating the second filter 114*a* (and the second additional filter 114*b*) and deactivating the ultrasonic transducer 106. Additionally, after delaying the predetermined period of time after deactivating the second filter 114*a* (and the second additional filter 114*b*) and deactivating the ultrasonic transducer 106, a cycle controller 184 of the circuitry controller 116 can determine whether to repeat a cycle by once again initiating activation of first filter 112*a* (and first additional filter 112*b*) and activation of the ultrasonic transducer 106, or instead end the cycle, based for example on a user control input to the cycle controller to end the cycle.

While the foregoing discussions have described ramping up and ramping down of the first and first additional signals and the second and second additional signals, FIG. 1 further shows clamp diodes 186*a*, 186*b*, 186*c*, 186*d* and transient voltage suppressor (TVS) diodes 188*a*, 188*b*, 188*c*, 188*d* for protecting circuitry in case current is unexpectedly interrupted. As shown in the example of FIG. 1, a first parallel combination of clamp diode and transient voltage suppressor diode 186*a*, 188*a* can be coupled between the first filter 112*a* and a ground reference. Similarly, a second parallel combination of clamp diode and transient voltage suppressor diode 186*b*, 188*b* can be coupled between the first additional filter 112*b* and the ground reference. Additionally, a third parallel combination of clamp diode and transient voltage suppressor diode 186*c*, 188*c* can be coupled between the second filter 114*a* and the ground reference. A fourth parallel combination of clamp diode and transient voltage suppressor diode 186*d*, 188*d* can be coupled between the second additional filter 114*b* and the ground reference.

Figure 2:
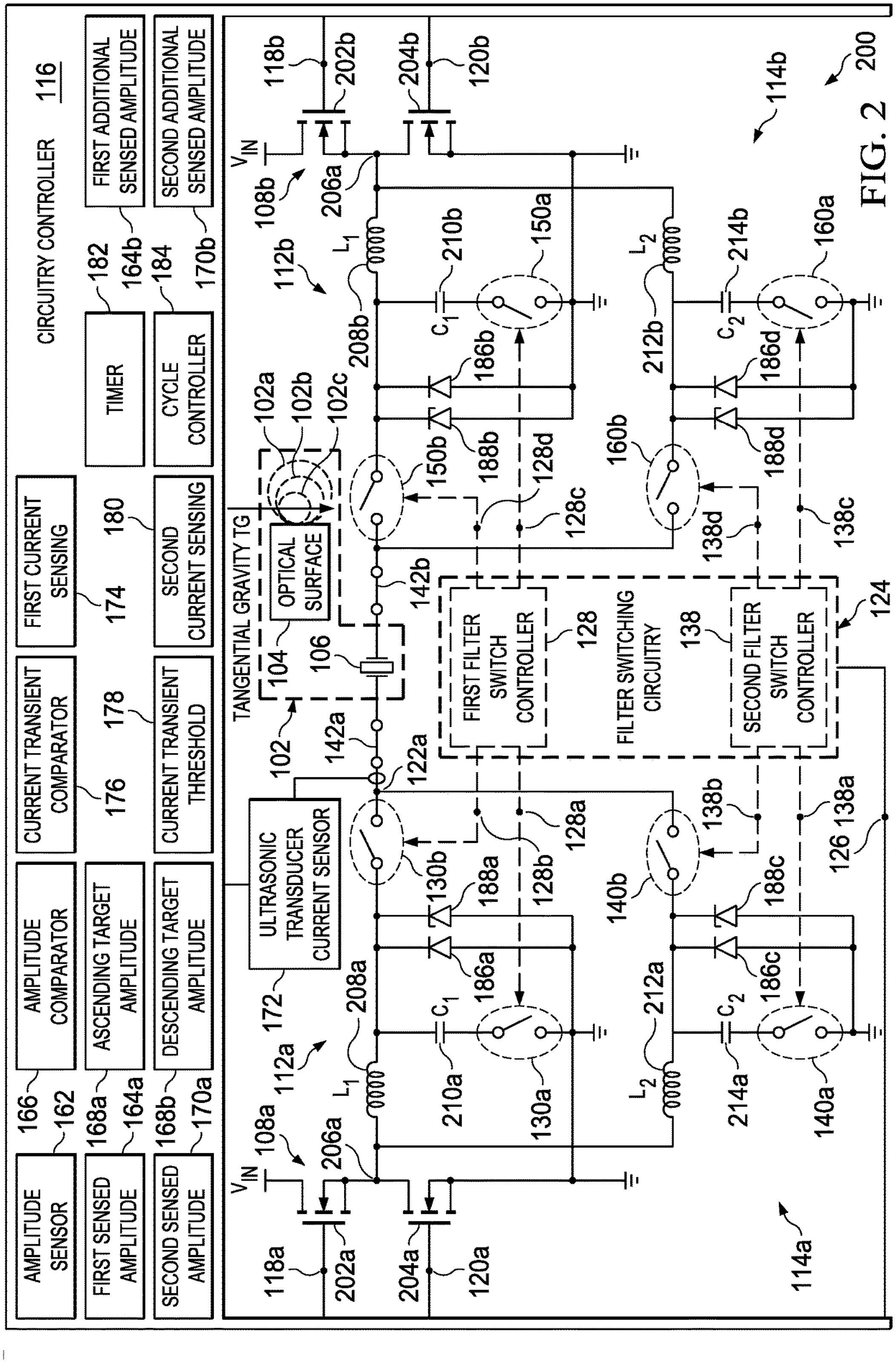
FIG. 2 is a more detailed diagram of the system shown in FIG. 1 according to an embodiment.

FIG. 2 is a more detailed diagram of the system shown in FIG. 1 according to an embodiment. Like example system 100 shown in FIG. 1, example system 200 shown in FIG. 2 can expel fluid from a droplet 102 on an optical surface 104 using an ultrasonic transducer 106 mechanically coupled to the optical surface 104. As shown in greater detail in the example of FIG. 2, first amplifier 108*a* can include a first pair of series coupled transistors 202*a*, 204*a* coupled between a DC voltage rail and a ground reference. Respective control gates of the first pair of transistors 202*a*, 204*a* can be coupled as the input 118*a*, 120*a* of the first amplifier 108*a*. The first and second filter networks 112*a*, 114*a* can be coupled to receive an output of the first amplifier 108*a* at a series coupling node 206*a* between first and second ones of the first pair of series coupled transistors 202*a*, 204*a*.

Similarly, as shown in greater detail in the example of FIG. 2, the second amplifier 108*b* can include a second pair of series coupled transistors 202*b*, 204*b* coupled between the DC voltage rail and the ground reference. Respective control gates of the second pair of transistors 202*b*, 204*b* can be coupled as the input 118*b*, 120*b* of the second amplifier 108*b*. The first and second additional filter networks 112*b*, 114*b* can be coupled to receive an output of the second amplifier 108*b* at a series coupling node 206*b* between first and second ones of the second pair of series coupled transistors 202*b*, 204*b*.

The first filter network 112*a* can include a series coupled inductor 208*a* coupled in series with the output of the first amplifier 108*a* at the series coupling node 206*a* between first and second ones of the first pair of series coupled transistors 202*a*, 204*a*. The first filter network 112*a* can also include a capacitor 210*a* coupled in series with the inductor 208*a*.

Similarly, second filter network 114*a* can include a series coupled inductor 212*a* coupled in series with the output of the first amplifier 108*a* at the series coupling node 206*a* between first and second ones of the first pair of series coupled transistors 202*a*, 204*a*. The second filter network 114*a* can also include a capacitor 214*a* coupled in series with the inductor 212*a*.

The first additional filter network 112*b* can include a series coupled inductor 208*b* coupled in series with the output of the second amplifier 108*b* at the series coupling node 206*b* between first and second ones of the second pair of series coupled transistors 202*b*, 204*b*. The first additional filter network 112*b* can also include a capacitor 210*b* coupled in series with the inductor 208*b*.

Similarly, second additional filter network 114*b* can include a series coupled inductor 212*b* coupled in series with the output of the second amplifier 108*b* at the series coupling node 206*b* between first and second ones of the second pair of series coupled transistors 202*b*, 204*b*. The second additional filter network 114*b* can also include a capacitor 214*b* coupled in series with the inductor 212*b*.

The first additional filter network 112*b* can be tuned (e.g., by its corresponding filter component values) in a similar way using the same or similar component values as the first filter network 112*a* can be tuned (e.g., by its corresponding filter component values). For example, the series coupled inductor 208*a* of the first filter network 112*a* can have an inductance L1 that is the same or similar as the inductance L1 of the series coupled inductor 208*b* of the first additional filter network 112*b*. Further, the series coupled capacitor 210*a* of the first filter network 112*a* can have a capacitance C1 that is the same or similar as the capacitance C1 of the series coupled capacitor 210*b* of the first additional filter network 112*b*.

Similarly, the second additional filter network 114*b* can be tuned (e.g., by its corresponding filter component values) in a similar way using the same or similar component values as the second filter network 114*a* can be tuned (e.g., by its corresponding filter component values). For example, the series coupled inductor 212*a* of the second filter network 114*a* can have an inductance L2 that is the same or similar as the inductance L2 of the series coupled inductor 212*b* of the second additional filter network 114*b*. Further, the series coupled capacitor 214*a* of the second filter network 114*a* can have a capacitance C2 that is the same or similar as the capacitance C2 of the series coupled capacitor 214*b* of the second additional filter network 114*b*.

As shown in the example of FIG. 2, the first filter network 112*a* and the first additional filter network 112*b* are tuned by their corresponding filter component values (e.g., series inductance L1 and series capacitance C1) within the first resonant frequency band to facilitate matching the respective first and second output impedance of the first and second amplifiers 108*a*, 108*b* with impedance of the ultrasonic transducer 106 mechanically coupled to the optical surface 104 and to reduce by atomization the fluid droplet 102 from the first droplet size 102*a* to the second droplet size 102*b*. The second filter network 114*a* and the second additional filter network 114*b* are tuned by their corresponding filter component values (e.g., series inductance L2 and series capacitance C2) within the second resonant frequency band to facilitate matching the first and second output impedances of the first and second amplifiers 108*a*, 108*b* with impedance of the ultrasonic transducer 106 mechanically coupled to the optical surface 104 and to reduce by atomization the fluid droplet 102 from the second droplet size 102*b* to the third droplet size 102*c*.

In the example of FIG. 2, the first filter network 112*a* and the first additional filter network 112*b* can be tuned to the first frequency by their corresponding filter component values (e.g., series inductance L1 and series capacitance C1) to be higher in frequency than the second filter network 114*a* and the second additional filter network 114*b* as tuned to the second frequency by their corresponding filter component values (e.g., series inductance L2 and series capacitance C2).

Although FIG. 2 shows example greater details of the first and second amplifier 108*a*, 108*b* than what is shown in FIG. 1, the example of FIG. 2 is similar to the example of FIG. 1 as already discussed in detail previously herein. Further, although FIG. 2 shows example greater details of the first and first additional filter networks 112*a*, 112*b* and shows example greater details of the second and second additional filter networks 114*a*, 114*b*, the example of FIG. 2 is similar to the example of FIG. 1 as already discussed in detail previously herein. Accordingly, FIG. 2 is not further discussed here, and the reader directed instead to the previous discussion of FIG. 1 for discussion of those elements that are similar to both the example of FIG. 1 and the example of FIG. 2.

The examples of FIGS. 1 and 2 show filter switching circuitry to switch the first and first additional filter networks 112*a*, 112*b* with the second and second additional filter networks 114*a*, 114*b*. In another example, the forgoing can be extended to include the filter switching circuitry to switch a third and third additional filter network (not shown in FIGS. 1 and 2). The filter switching circuitry coupled between the circuitry controller and the third filter network (and between the circuitry controller and the third additional filter network) to activate the third filter (and to activate the third additional filter) in response to a third control signal from the circuitry controller. The third and third additional filter network can be tuned within a third resonant frequency band to facilitate matching the first output impedance of the first amplifier with impedance of the ultrasonic transducer mechanically coupled to the surface and to reduce the fluid droplet by atomization. The circuitry controller can be coupled with the input of the first amplifier to generate a third signal at the input of the ultrasonic transducer, the third signal including a third frequency within the third resonant frequency band of the ultrasonic transducer mechanically coupled to the surface.

Just discussed was switching circuitry to switch the first and first additional filter networks, with the second and second additional filter networks and with the third and third additional filter networks. In yet another example, this architecture can be extended even further to include the filter switching circuitry to switch a fourth and fourth additional filter network (not shown in FIGS. 1 and 2). The filter switching circuitry coupled between the circuitry controller and the fourth filter network (and between the circuitry controller and the fourth additional filter network) to activate the fourth filter (and to activate the fourth additional filter) in response to a fourth control signal from the circuitry controller. The fourth and fourth additional filter network can be tuned within a fourth resonant frequency band to facilitate matching the first output impedance of the first amplifier with impedance of the ultrasonic transducer mechanically coupled to the surface and to reduce the fluid droplet by atomization. The circuitry controller can be coupled with the input of the first amplifier to generate a fourth signal at the input of the ultrasonic transducer, the fourth signal including a fourth frequency within the fourth resonant frequency band of the ultrasonic transducer mechanically coupled to the surface.

The forgoing examples can be extended even further, to further examples including the switching circuitry to switch activation of fifth, sixth, and so on, filter networks, up to an arbitrary number Nth filter network, and up to an arbitrary number Nth resonant frequency band.

The foregoing examples are directed to a plurality of filters tuned within respective resonant frequency bands of the ultrasonic transducer mechanically coupled to the surface. More broadly, the ultrasonic transducer mechanically coupled to the surface can have a plurality of resonant frequency bands, and a filter can cover the plurality of resonant frequency bands. For example, the filter can be the plurality of filters tuned within respective resonant frequency bands of the ultrasonic transducer mechanically coupled to the surface. As another example, the filter can be a single filter covering the plurality of resonant frequency bands.

In the foregoing examples, a plurality of signals can be generated having respective frequencies within respective resonant frequency bands of the ultrasonic transducer 106 mechanically coupled to the surface 104. The ultrasonic transducer 106 can be activated at the respective frequencies within the respective resonant frequency bands using the plurality of signals. Multistage reducing of the fluid droplet 102 by atomization can be carried out in response to activating the ultrasonic transducer 106 using the plurality of signals at the respective frequencies within the respective resonant frequency bands. The plurality of signals can have respective frequency sweeps within respective resonant frequency bands of the ultrasonic transducer 106 mechanically coupled to the surface 104. Generating the plurality of signals can include generating the first signal having the first frequency within the first resonant frequency band of the ultrasonic transducer 106 mechanically coupled to the surface 104. Generating the plurality of signals can also include generating the second signal having the second frequency within the second resonant frequency band of the ultrasonic transducer 106 mechanically coupled to the surface 104. Activating the ultrasonic transducer 106 can include activating the ultrasonic transducer at the first frequency within the first resonant frequency band using the first signal. Activating the ultrasonic transducer 106 can also include activating the ultrasonic transducer at the second frequency within the second resonant frequency band using the second signal. The multistage reducing of the fluid droplet 102 can include a first stage, reducing the fluid droplet 102 from the first droplet size 102*a* to the second droplet size 102*b* in response to activating the ultrasonic sonic transducer 106 using the first signal at the first frequency within the first resonant frequency band. The multistage reducing of the fluid droplet 102 can also include a second stage, reducing the fluid droplet from the second size 102*b* to the third size 102*c* in response to activating the ultrasonic transducer 106 using the second signal at the second frequency within the second resonant frequency band.

Figure 3A:
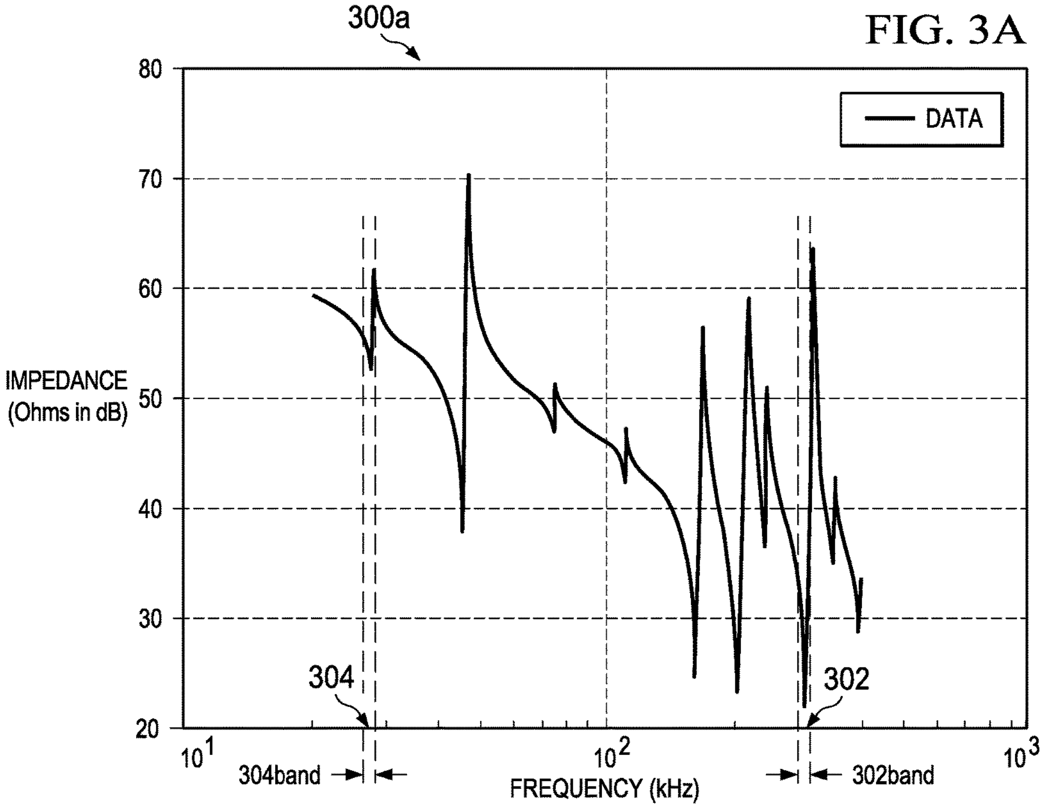
FIG. 3A is a diagram of impedance versus frequency for an example ultrasonic transducer mechanically coupled to an example optical surface according to an embodiment.

FIG. 3A is a diagram 300*a* of impedance (Ohms in decibels) versus frequency (logarithmic scale in kilohertz) for an example ultrasonic transducer mechanically coupled to an example optical surface according to an embodiment. FIG. 3A shows the example first frequency 302 of an example three-hundred kilohertz for the example ultrasonic transducer mechanically coupled to the example optical surface. The example first frequency 302 of the example three-hundred kilohertz can corresponds to a first nominal resonance frequency of a first low impedance resonance extremity 302 in the diagram of FIG. 3A at the first frequency 302 of the example ultrasonic transducer mechanically coupled to the example optical surface. The example first frequency 302 of the example three-hundred kilohertz can correspond to the first nominal resonance frequency of the first low impedance resonance extremity 302 that is centered within a first resonance band "302band". More broadly, the first frequency 302 is within a first resonance band "302band". The first resonance band is defined herein as extending in frequency to plus and minus ten percent of the first nominal resonance frequency of the first low impedance resonance extremity for the ultrasonic transducer mechanically coupled to the optical surface. For example, with the example first frequency of the example three-hundred kilohertz, the first resonance band extends in frequency to plus and minus ten percent of the first nominal resonance frequency of three-hundred kilohertz (e.g. the first resonance band extends in frequency to plus and minus thirty kilohertz from the three-hundred kilohertz, or the first resonance band extends in frequency from two-hundred-and-seventy kilohertz to three-hundred-and-thirty kilohertz).

Further, FIG. 3A shows the example second frequency 304 of an example twenty-six kilohertz for the example ultrasonic transducer mechanically coupled to the example optical surface. The example second frequency 304 of the example twenty-six kilohertz corresponds to a second nominal resonance frequency of a second low impedance resonance extremity 304 in the diagram of FIG. 3A at the second frequency 304 of the example ultrasonic transducer mechanically coupled to the example optical surface. The example second frequency 304 of the example twenty-six kilohertz corresponds to the second nominal resonance frequency of the second low impedance resonance extremity 304 that is centered within a second resonance band "304band". More broadly, the second frequency 302 is within a second resonance band "304band". The second resonance band is defined herein as extending in frequency to plus and minus ten percent of the second nominal resonance frequency of the second low impedance resonance extremity for the ultrasonic transducer mechanically coupled to the optical surface. For example, with the example second frequency of the example twenty-six kilohertz, the second resonance band extends in frequency to plus and minus ten percent of the second nominal resonance frequency of twenty-six kilohertz (e.g. the second resonance band extends in frequency to plus and minus two and six-tenths kilohertz from the twenty-six kilohertz, or the second resonance band extends in frequency from twenty-three-and-four-tenths kilohertz to twenty-eight-and-six-tenths kilohertz).

Figure 3B:
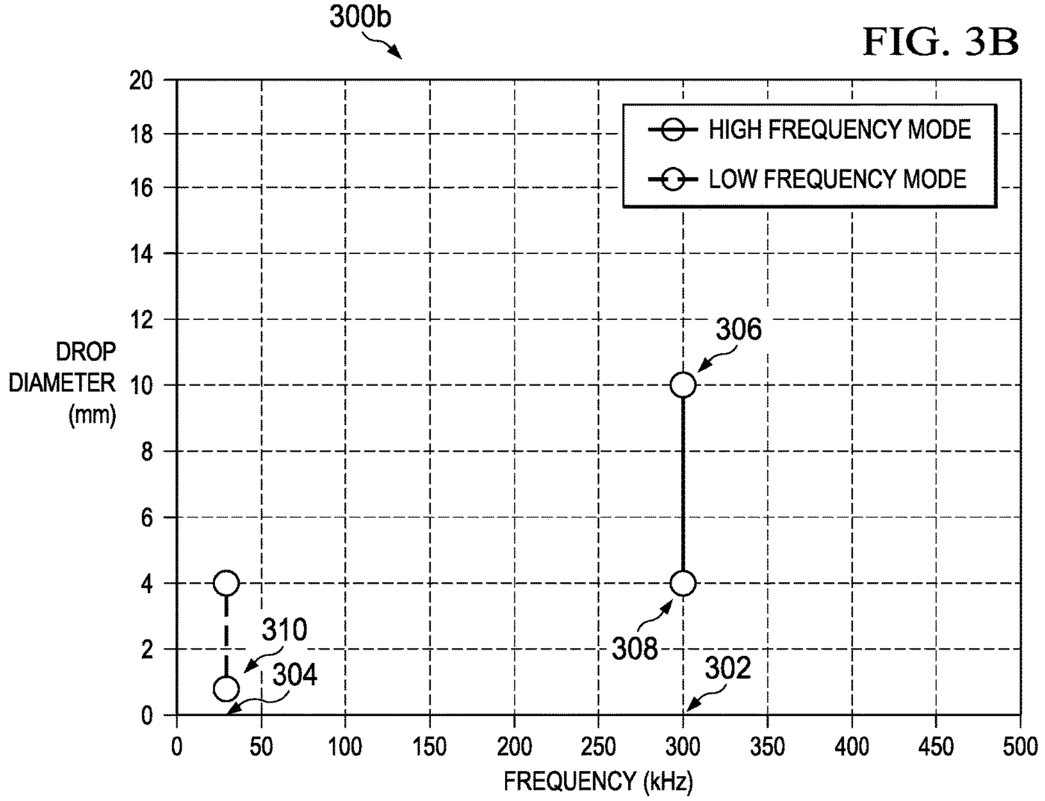
FIG. 3B is a diagram of example droplet size reduction versus frequency according to an embodiment.

FIG. 3B is a diagram 300*b* of example droplet size reduction versus frequency according to an embodiment. The example of FIG. 3B shows the example first frequency 302 of the example three-hundred kilohertz for the example ultrasonic transducer mechanically coupled to the example optical surface. As shown in the example of FIG. 3B, the example first frequency 302 of the example three-hundred kilohertz can reduce the droplet from the first droplet size 306 (e.g., reduce from ten millimeters in droplet diameter) to the second droplet size 308 (e.g., reduce to four millimeters in droplet diameter). This example can be a first expelling mode.

Further, the example of FIG. 3B shows the example second frequency 304 of the example twenty-six kilohertz for the example ultrasonic transducer mechanically coupled to the example optical surface. As shown in the example of FIG. 3B, the example second frequency 304 of the example twenty-six kilohertz can reduce the droplet from the second droplet size 308 (e.g., reduce from four millimeters in droplet diameter) to the third droplet size 310 (e.g., reduce to eight-tenths of a millimeter in droplet diameter). This example can be a second expelling mode.

While example manners of implementing the example systems 100, 200 that can expel fluid from a droplet 102 on an optical surface 104 using an ultrasonic transducer 106 mechanically coupled to the optical surface 104 of FIGS. 1 and 2, one or more of the elements, processes and/or devices illustrated in FIGS. 1 and 2 may be combined, divided, re-arranged, omitted, eliminated and/or implemented in any other way.

Further, the example systems 100, 200, example ultrasonic transducer 106, example first amplifier 108*a*, example second amplifier 108*b*, example first amplifier impedance 110*a*, example second amplifier impedance 110*b*, example first filter network 112*a*, example first additional filter network 112*b*, example second filter network 114*a*, example second filter network 114*b*, example circuitry controller 116, example first amplifier inputs 118*a*, 120*a*, example second amplifier inputs 118*b*, 120*b*, example input of ultrasonic transducer 122*a*, example additional input of ultrasonic transducer 122*b*, example filter switching circuitry 124, example input 126 of the filter switching circuitry, example first filter switch control 128, example first low side switch control output 128*a*, example first high side switch control output 128*b*, example first additional low side switch control output 128*c*, example first additional high side switch control output 128*d*, example first low side switch 130*a*, example first high side switch 130*b*, example second filter switch control 138, example second low side switch control output 138*a*, example second high side switch control output 138*b*, example second additional low side switch control output 138*c*, example second additional high side switch control output 138*d*, example second low side switch 140*a*, example second high side switch 140*b*, example ultrasonic transducer couplers 142*a*, 142*b*, example first additional low side switch 150*a*, example first additional high side switch 150*b*, example second additional low side switch 160*a*, example second additional high side switch 160*b*, example amplitude sensor 162, example first sensed amplitude 164*a*, example first additional sensed amplitude 164*b*, example amplitude comparator 166, example ascending target amplitude 168*a*, example descending target amplitude 168*b*, example second sensed amplitude 170*a*, example second additional sensed amplitude 170*b*, example ultrasonic transducer current sensor 172, example first current sensing 174, example current transit comparator 176, example current transient threshold 178, example second current sensing 180, example timer 182, example cycle controller 184, example clamp diodes 186*a*, 186*b*, 186*c*, 186*d*, example transient voltage suppressor (TVS) diodes 188*a*, 188*b*, 188*c*, 188*d*, example first transistor pair 202*a*, 204*a*, example second transistor pair 202*b*, 204*b*, example outputs of series coupling nodes 206*a*, 206*b*, example series coupled inductors 208*a*, 208*b*, 212*a*, 212*b*, and example series coupled capacitors 210*a*, 210*b*, 214*a*, 214*b*, as shown in the examples of FIGS. 1 and 2 may be implemented by hardware, software, firmware and/or any combination of hardware, software and/or firmware, and may be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Further still, the example systems 100, 200, example fluid droplet 102, example first droplet size 102*a*, example second droplet size 102*b*, example third droplet size 102*c*, example optical surface 104, example ultrasonic transducer 106, example first amplifier 108*a*, example second amplifier 108*b*, example first amplifier impedance 110*a*, example second amplifier impedance 110*b*, example first filter network 112*a*, example first additional filter network 112*b*, example second filter network 114*a*, example second filter network 114*b*, example circuitry controller 116, example first amplifier inputs 118*a*, 120*a*, example second amplifier inputs 118*b*, 120*b*, example input of ultrasonic transducer 122*a*, example additional input of ultrasonic transducer 122*b*, example filter switching circuitry 124, example input 126 of the filter switching circuitry, example first filter switch control 128, example first low side switch control output 128*a*, example first high side switch control output 128*b*, example first additional low side switch control output 128*c*, example first additional high side switch control output 128*d*, example first low side switch 130*a*, example first high side switch 130*b*, example second filter switch control 138, example second low side switch control output 138*a*, example second high side switch control output 138*b*, example second additional low side switch control output 138*c*, example second additional high side switch control output 138*d*, example second low side switch 140*a*, example second high side switch 140*b*, example ultrasonic transducer couplers 142*a*, 142*b*, example first additional low side switch 150*a*, example first additional high side switch 150*b*, example second additional low side switch 160*a*, example second additional high side switch 160*b*, example amplitude sensor 162, example first sensed amplitude 164*a*, example first additional sensed amplitude 164*b*, example amplitude comparator 166, example ascending target amplitude 168*a*, example descending target amplitude 168*b*, example second sensed amplitude 170*a*, example second additional sensed amplitude 170*b*, example ultrasonic transducer current sensor 172, example first current sensing 174, example current transit comparator 176, example current transient threshold 178, example second current sensing 180, example timer 182, example cycle controller 184, example clamp diodes 186*a*, 186*b*, 186*c*, 186*d*, example transient voltage suppressor (TVS) diodes 188*a*, 188*b*, 188*c*, 188*d*, example first transistor pair 202*a*, 204*a*, example second transistor pair 202*b*, 204*b*, example outputs of series coupling nodes 206*a*, 206*b*, example series coupled inductors 208*a*, 208*b*, 212*a*, 212*b*, and example series coupled capacitors 210*a*, 210*b*, 214*a*, 214*b*, as shown in the examples of FIGS. 1 and 2, may include one or more elements, processes and/or devices in addition to, or instead of, those illustrated in FIGS. 1 and 2, and/or may include more than one of any or all of the illustrated elements, processes and devices.

When reading any of the apparatus or system claims of this patent to cover a purely software and/or firmware implementation, at least one of the example systems 100, 200, example ultrasonic transducer 106, example first amplifier 108*a*, example second amplifier 108*b*, example first amplifier impedance 110*a*, example second amplifier impedance 110*b*, example first filter network 112*a*, example first additional filter network 112*b*, example second filter network 114*a*, example second filter network 114*b*, example circuitry controller 116, example first amplifier input 118*a*, 120*a*, example second amplifier input 118*b*, 120*b*, example input of ultrasonic transducer 122*a*, example additional input of ultrasonic transducer 122*b*, example filter switching circuitry 124, example input 126 of the filter switching circuitry, example first filter switch control 128, example first low side switch control output 128*a*, example first high side switch control output 128*b*, example first additional low side switch control output 128*c*, example first additional high side switch control output 128*d*, example first low side switch 130*a*, example first high side switch 130*b*, example second filter switch control 138, example second low side switch control output 138*a*, example second high side switch control output 138*b*, example second additional low side switch control output 138*c*, example second additional high side switch control output 138*d*, example second low side switch 140*a*, example second high side switch 140*b*, example ultrasonic transducer couplers 142*a*, 142*b*, example first additional low side switch 150*a*, example first additional high side switch 150*b*, example second additional low side switch 160*a*, example second additional high side switch 160*b*, example amplitude sensor 162, example first sensed amplitude 164*a*, example first additional sensed amplitude 164*b*, example amplitude comparator 166, example ascending target amplitude 168*a*, example descending target amplitude 168*b*, example second sensed amplitude 170*a*, example second additional sensed amplitude 170*b*, example ultrasonic transducer current sensor 172, example first current sensing 174, example current transit comparator 176, example current transient threshold 178, example second current sensing 180, example timer 182, example cycle controller 184, example clamp diodes 186*a*, 186*b*, 186*c*, 186*d*, example transient voltage suppressor (TVS) diodes 188*a*, 188*b*, 188*c*, 188*d*, example first transistor pair 202*a*, 204*a*, example second transistor pair 202*b*, 204*b*, example outputs of series coupling nodes 206*a*, 206*b*, example series coupled inductors 208*a*, 208*b*, 212*a*, 212*b*, and example series coupled capacitors 210*a*, 210*b*, 214*a*, 214*b*, as shown in the examples of FIGS. 1 and 2 is/are hereby expressly defined to include a tangible computer readable storage device or storage disk such as a memory, a digital versatile disk (DVD), a compact disk (CD), a Blu-ray disk, etc. storing the software and/or firmware.

FIGS. 4A-4F show a flowchart representative of example machine readable instructions that may be executed to implement the example system 100 to expel fluid of the fluid droplet 102 from the optical surface 104 using the ultrasonic transducer 106 mechanically coupled to the optical surface 104, according to an embodiment as shown in the example of FIG. 1. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory (e.g., FLASH memory) associated with the processor 512, but the entire program and/or parts thereof could alternatively be executed by a device other than the processor 512 and/or embodied in firmware or dedicated hardware. Further, although the example program is described with reference to the flowchart illustrated in FIGS. 4A-4F, many other methods of implementing the example system 100 to expel fluid of the fluid droplet 102 from the optical surface 104 using the ultrasonic transducer 106 mechanically coupled to the optical surface 104 of this disclosure may alternatively be used. For example, the order of execution of the blocks may be changed, and/or some of the blocks described may be changed, eliminated, or combined. As used herein, when the phrase “at least” is used as the transition term in a preamble of a claim, it is open-ended in the same manner as the term “comprising” is open ended. Comprising and all other variants of “comprise” are expressly defined to be open-ended terms. Including and all other variants of “include” are also defined to be open-ended terms. In contrast, the term consisting and/or other forms of consist are defined to be close-ended terms.

As mentioned above, the example processes of FIGS. 4A-4F may be implemented using coded instructions (e.g., computer and/or machine readable instructions) stored on a tangible computer readable storage medium such as a hard disk drive, a FLASH memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, “tangible computer readable storage medium” and “tangible machine readable storage medium” are used interchangeably. Additionally or alternatively, the example processes of FIGS. 4A-4F may be implemented using coded instructions (e.g., computer and/or machine readable instructions) stored on a non-transitory computer and/or machine readable medium such as a hard disk drive, a FLASH memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

A process flow 400 of FIGS. 4A-4F can begin at block 402. At block 402, the optical surface can be oriented within a gravitational field so that a component of the gravitational field that is tangential to the surface operates upon the fluid droplet. For example, as shown in the example of FIG. 1, the optical surface 104 can be oriented within a gravitational field so that a component of the gravitational field that is tangential to the surface 104 (e.g., as depicted for by downward arrow tangential to surface 104) operates upon the fluid droplet 102. This orientation can be achieved, for example, while activating the ultrasonic transducer 106 that is mechanically coupled to the optical surface 104 to expel fluid of the fluid droplet 102 from the optical surface. For example, the foregoing orienting of the optical surface 104 can be orienting the optical surface 104 within the gravitational field so that the component of the gravitational field that is tangential to the optical surface 104 is greater than a component of the gravitation field that is normal into the optical surface 104.

Figure 4A:
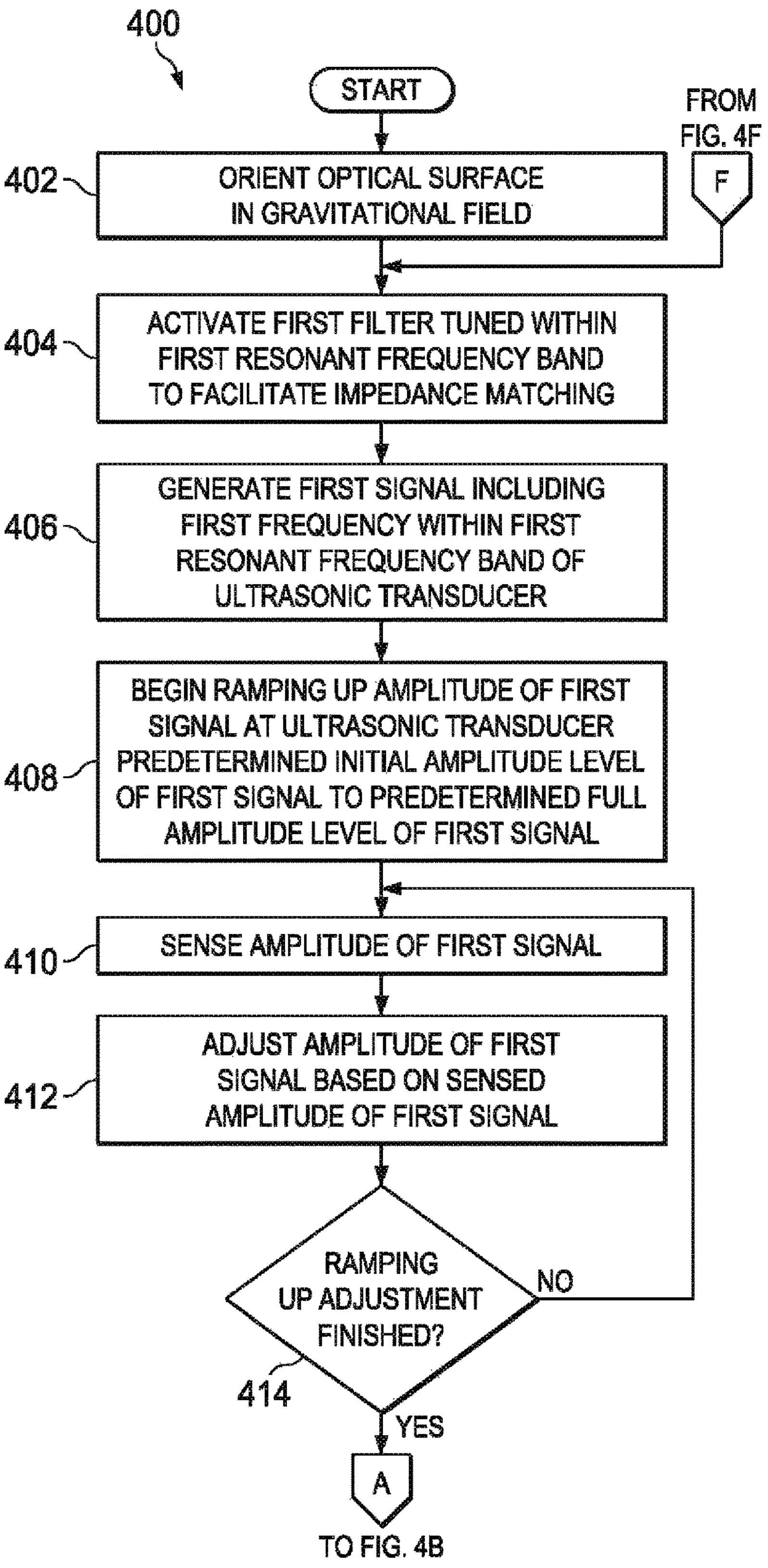
FIGS. 4A-4F show a flowchart representative of example machine readable instructions that may be executed to implement the example system to expel fluid from the droplet on the optical surface using the ultrasonic transducer mechanically coupled to the optical surface, according to an embodiment as shown in the example of FIG. 1.

Next, as shown in example of FIG. 4A, at block 404 the first filter (and the first additional filter) tuned within the first resonant frequency band can be activated to facilitate impedance matching of the first amplifier (and the second amplifier) with impedance of the ultrasonic transducer. As shown for example in FIG. 1, the first filter 112*a* (e.g., first filter network 112*a*) is tuned (e.g., by its corresponding filter component values) within the first resonant frequency band to facilitate matching the first output impedance 110*a* of the first amplifier 108*a* with impedance of the ultrasonic transducer 106 mechanically coupled to the optical surface 104. Similarly, as shown for example in FIG. 1, the first additional filter 112*b* (e.g., first additional filter network 112*b*) is tuned (e.g., by its corresponding filter component values)

within the first resonant frequency band to facilitate matching the second output impedance 110*b* of the second amplifier 108*b* with impedance of the ultrasonic transducer 106 mechanically coupled to the optical surface 104. In the example of FIG. 1, filter activation (and deactivation), as well as activation (and deactivation) of the ultrasonic transducer 106, can be carried out by filter switching circuitry 124, which is depicted in the drawings using stippled lines. For example, the filter switching circuitry 124 can be coupled between the circuitry controller 116 and the first filter 112*a* (e.g., first filter network 112*a*) to activate the first filter 112*a* (e.g. first filter network 112*a*) in response to a first control activation signal received from the circuitry controller 116 at an input 126 of the filter switching circuitry 124. Similarly, at the same time, the filter switching circuitry 124 can be coupled between the circuitry controller 116 and the first additional filter 112*b* (e.g., first additional filter network 112*b*) to activate the first additional filter 112*b* (e.g. first additional filter network 112*b*) in response to the first control activation signal received from the circuitry controller 116 at the input 126 of the filter switching circuitry 124.

Next, as shown in example of FIG. 4A, at block 406 the first signal (and the first additional signal) including the first frequency within the first resonant frequency band of the ultrasonic transducer can be generated. For example, as shown in the example of FIG. 1, the circuitry controller 116 can be coupled with the input 118*a*, 120*a* of the first amplifier 108*a* to generate the first signal at the input 122*a* of ultrasonic transducer 106. Similarly, at the same time, the circuitry controller 116 can be coupled with the additional input 118*b*, 120*b* of the second amplifier 108*b* to generate the first additional signal at the additional input 122*b* of ultrasonic transducer 106. The first signal at the input 122*a* of the ultrasonic transducer 106 includes the first frequency within the first resonant frequency band of the ultrasonic transducer 106 mechanically coupled to the optical surface 104. Similarly, the first additional signal at the additional input 122*b* of the ultrasonic transducer 106 likewise can include the first frequency within the first resonant frequency band of the ultrasonic transducer 106 mechanically coupled to the optical surface 104.

Next, as shown in the example of FIG. 4A, at block 408 a ramping up of the amplitude of the first signal (and of the first additional signal) at ultrasonic transducer can begin from the predetermined initial amplitude level of first signal (and of the first additional signal) to the predetermined full amplitude level of first signal (and of the first additional signal). For example, as shown in the example of FIG. 1, the circuitry controller 116 can begin ramping up the amplitude of the first signal at the ultrasonic transducer 106 from a predetermined initial amplitude level of the first signal to a predetermined full amplitude level of the first signal. At the same time, in a similarly way, circuitry controller 116 can also begin ramping up the amplitude of the first additional signal at the ultrasonic transducer 106 from a predetermined initial amplitude level of the first additional signal to a predetermined full amplitude level of the first additional signal. For example, respective amplitudes of the first signal and the first additional signal can be ramped up (e.g., increased) by the circuitry controller 116 from their respective predetermined initial amplitude levels to their respective predetermined full amplitude levels at a predetermined ramp up rate.

Next, as shown in the example of FIG. 4A, at block 410 an amplitude of the first signal can be sensed (and an amplitude of the first additional signal can be sensed). For example, as shown in the example of FIG. 1, the circuitry controller 116 can include an amplitude sensor 162 that can sense amplitude of the first signal, for example, to determine a first sensed amplitude 164*a* of the first signal and the first additional signal.

Next, as shown in the example of FIG. 4A, at block 412 an amplitude of the first signal and the first additional signal can be adjusted (e.g., increased) based on the sensed amplitude of the first signal and the first additional signal. Next, as shown in the example of FIG. 4A, at decision block 414 it is determined whether adjusting the amplitude of the first signal is finished (and whether adjusting the amplitude of the first additional signal is finished). For example, at decision block 414 it is determined whether the ramping up adjustment to increase amplitude of the first signal is finished (and whether the ramping up adjustment to increase amplitude of the first additional signal is finished). If it is determined by the circuitry controller that adjusting the amplitude of the first signal is not finished, for example ramping up adjustment is not finished (and, for example, that adjusting the amplitude of the first additional signal is not finished, for example, ramping up is not finished), then flow of execution can be redirected to block 410 to sense amplitude of the first signal (and, for example, to sense amplitude of the first additional signal and the first additional signal). However, if it is determined by the circuitry controller that the adjusting the amplitude of the first signal is finished for example, ramping up is finished (and, for example, that the adjusting the amplitude of the first additional signal is finished, for example, ramping up is finished), then flow of execution can be directed to block 416 of FIG. 4B.

Figure 4B:
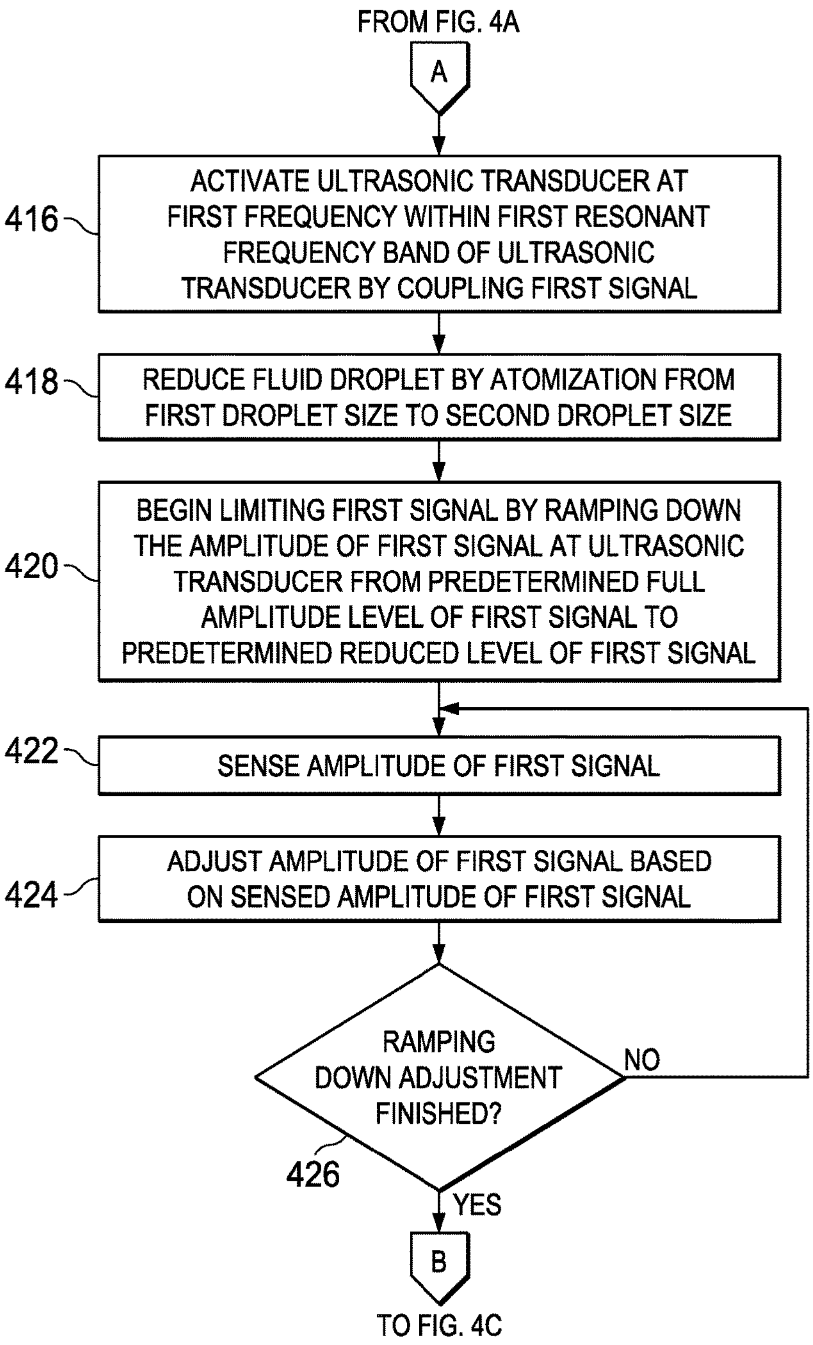

Next, as shown in the example of FIG. 4B, at block 416 the ultrasonic transducer is activated at the first frequency within the first resonant frequency band of the ultrasonic transducer by coupling the first signal (and the first additional signal) with the ultrasonic transducer. At block 418, the activated ultrasonic transducer can expel fluid from the fluid droplet to reduce the fluid droplet by atomization from the first droplet size to the second droplet size. For example, as shown in the example of FIG. 1, the ultrasonic transducer 106 can be activated at the first frequency within the first resonant frequency band of the ultrasonic transducer 106, for example, by coupling the first signal and the first additional signal to reduce the fluid droplet 102 by atomization from the first droplet size 102*a* to the second droplet size 102*b*.

Next, as shown in the example of FIG. 4B, at block 420 the limiting of the first signal (and limiting of the first additional signal) by ramping down the amplitude of first signal (and by ramping down the first additional signal) at the ultrasonic transducer can begin. For example, respective amplitudes of the first signal and the first additional signal can be ramped down (e.g., decreased) by the circuitry controller from their respective predetermined full amplitude levels to their respective predetermined reduced amplitude levels at a predetermined ramp down rate. For example, such limiting can include ramping down from the predetermined full amplitude level of the first signal to the predetermined reduced level of the first signal, and can include ramping down from the predetermined full amplitude level of the first additional signal to the predetermined reduced level of the first additional signal. At block 422 the amplitude of first signal can be sensed (and the amplitude of the first additional signal can be sensed). For example, as shown in the example of FIG. 1, the amplitude sensor 162 can sense amplitude of the first signal and the first additional signal, for example, to determine the first sensed amplitude 164*a* of the first signal and the first additional signal when the first signal and the first additional signal are being limited and/or reduced.

As shown in the example of FIG. 4B, at block 424 amplitude of the first signal can be adjusted (e.g., decreased) based on sensed amplitude of first signal and the first additional signal. At decision block 426 it is determined by the circuitry controller whether adjusting the amplitude of the first signal is finished (and whether adjusting the amplitude of the first additional signal is finished). For example, at decision block 426 it is determined whether the ramping down adjustment to decrease amplitude of the first signal is finished (and whether the ramping down adjustment to decrease amplitude of the first additional signal is finished). If it is determined that adjusting the amplitude of the first signal is not finished, for example ramping down adjustment is not finished (and, for example, that adjusting the amplitude of the first additional signal is not finished, for example, ramping down is not finished), then flow of execution can be redirected to block 422 to sense amplitude of the first signal (and, for example, to sense amplitude of the first additional signal). However, if it is determined by the circuitry controller that adjusting the amplitude of the first signal is finished for example, ramping down is finished (and, for example, that adjusting the amplitude of the first additional signal is finished, for example, ramping down is finished), then flow of execution can be directed to block 428 of FIG. 4C.

Figure 4C:
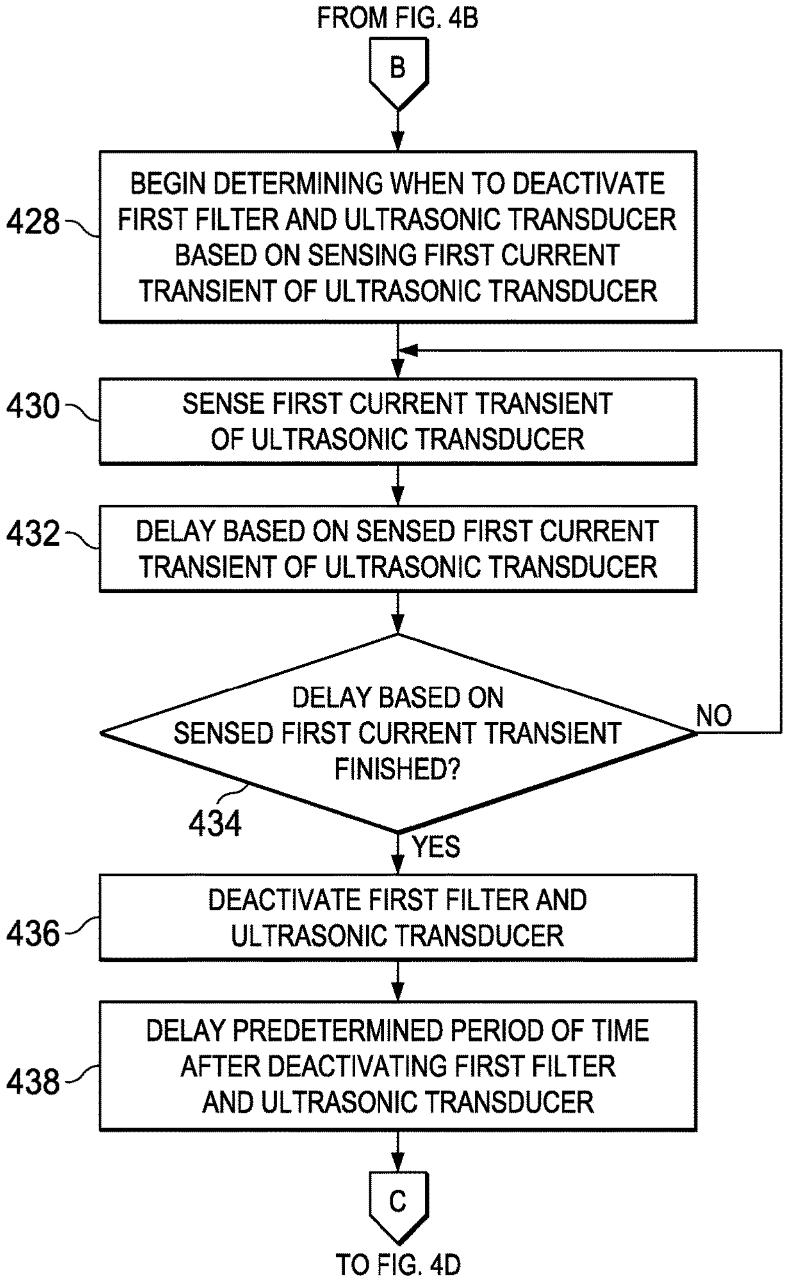

As shown in the example of FIG. 4C, at block 428 determining when to deactivate first filter (and deactivate the first additional filter) and deactivate the ultrasonic transducer based on sensing the first current transient of ultrasonic transducer can begin. At block 430 the first current transient of ultrasonic transducer can be sensed. At block 432, delay the deactivation of the first filter (and deactivation of the first additional filter) and deactivation of the ultrasonic transducer can be based on the sensed first current transient of ultrasonic transducer. For example, as shown in the example of FIG. 1, the circuitry controller 116 can begin determining when to deactivate the first filter 112_a_ (and the first additional filter 112_b_) and the ultrasonic transducer 106 based on sensing the first current transient of the ultrasonic transducer 106. As shown for example in FIG. 1, the ultrasonic transducer current sensor 172 can be coupled to the ultrasonic transducer 106 to sense current transients, for example, to sense the first current transient of the ultrasonic transducer.

As shown in FIG. 4C, at decision block 434 it can be determined by the circuitry controller whether delaying deactivation of the first filter (and deactivation of the first additional filter) and deactivation of the ultrasonic transducer based on the sensed first current transient of the ultrasonic transducer is finished. If it is determined that delaying such deactivation is not finished, then flow of execution can be redirected to block 430 to sense amplitude of the first current transient of the ultrasonic transducer. However, if it is determined by the circuitry controller that delaying such deactivation is finished, then flow of execution can be directed to block 436 of FIG. 4C. At block 436 of FIG. 4C, the first filter and the first additional filter and the ultrasonic transducer are deactivated, when delaying such deactivation is finished.

Next, after deactivating the first filter (and the first additional filter) and the ultrasonic transducer, as shown in the example of FIG. 4C, at block 438 there can be a delay of a predetermined period of time. For example, as shown in the example of FIG. 1, the circuitry controller 116 can use, for example, timer 182 to delay the predetermined period of time after deactivating the first filter 112_a_ (and the first additional filter 112_b_) and deactivating the ultrasonic transducer 106.

Figure 4D:
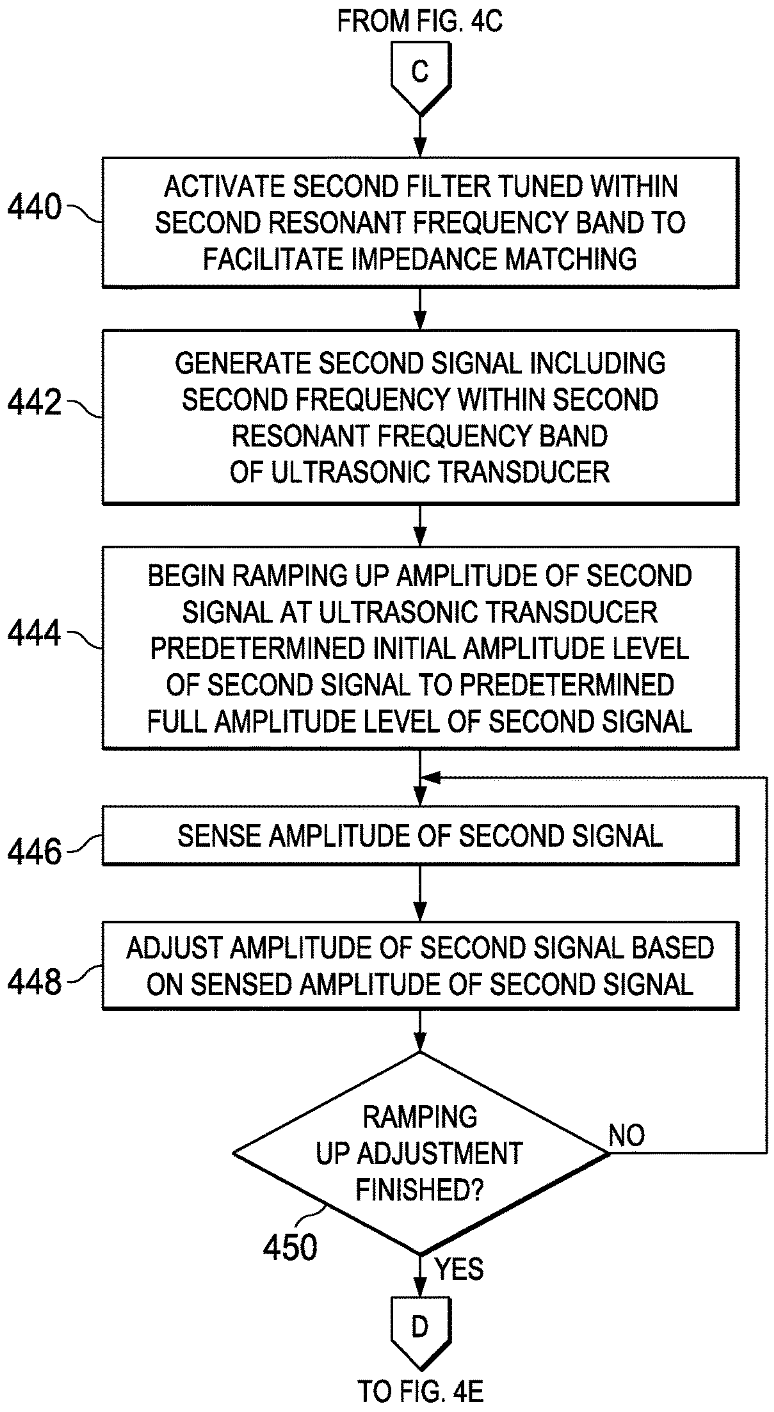

Next, as shown in the example of FIG. 4D, at block 440 the second filter (and the second additional filter) tuned within the second resonant frequency band can be activated to facilitate impedance matching of the first amplifier (and the second amplifier) with impedance of the ultrasonic transducer. As shown for example in FIG. 1, the second filter 114_a_ (e.g., second filter network 114_a_) is tuned (e.g., by its corresponding filter component values) within the second resonant frequency band to facilitate matching the first output impedance 110_a_ of the first amplifier 108_a_ with impedance of the ultrasonic transducer 106 mechanically coupled to the optical surface 104. Similarly, as shown for example in FIG. 1, the second additional filter 114_b_ (e.g., second additional filter network 114_b_) is tuned (e.g., by its corresponding filter component values) within the second resonant frequency band to facilitate matching the second output impedance 110_b_ of the second amplifier 108_b_ with impedance of the ultrasonic transducer 106 mechanically coupled to the optical surface 104.

Next, as shown in example of FIG. 4D, at block 442 the second signal (and the second additional signal) including the second frequency within the second resonant frequency band of the ultrasonic transducer can be generated. For example, as shown in the example of FIG. 1, the circuitry controller 116 can be coupled with the input 118_a_, 120_a_ of the first amplifier 108_a_ to generate the second signal at the input 122_a_ of ultrasonic transducer 106. Similarly, at the same time, the circuitry controller 116 can be coupled with the additional input 118_b_, 120_b_ of the second amplifier 108_b_ to generate the second additional signal at the additional input 122_b_ of ultrasonic transducer 106. The second signal at the input 122_a_ of the ultrasonic transducer 106 includes the second frequency within the second resonant frequency band of the ultrasonic transducer 106 mechanically coupled to the optical surface 104. Similarly, the second additional signal at the additional input 122_b_ of the ultrasonic transducer 106 likewise can include the second frequency within the second resonant frequency band of the ultrasonic transducer 106 mechanically coupled to the optical surface 104.

Next, as shown in the example of FIG. 4D, at block 444 a ramping up of the amplitude of the second signal (and of the second additional signal) at ultrasonic transducer can begin from the predetermined initial amplitude level of second signal (and of the second additional signal) to the predetermined full amplitude level of second signal (and of the second additional signal). For example, respective amplitudes of the second signal and the second additional signal can be ramped up (e.g., increased) by the circuitry controller from their respective predetermined initial amplitude levels to their respective predetermined full amplitude levels at a predetermined ramp up rate. For example, as shown in the example of FIG. 1, the circuitry controller 116 can begin ramping up the amplitude of the second signal at the ultrasonic transducer 106 from a predetermined initial amplitude level of the second signal to a predetermined full amplitude level of the second signal. At the same time, in a similarly way, circuitry controller 116 can also begin ramping up the amplitude of the second additional signal at the ultrasonic transducer 106 from a predetermined initial amplitude level of the second additional signal to a predetermined full amplitude level of the second additional signal.

Next, as shown in the example of FIG. 4D, at block 446 an amplitude of the second signal can be sensed (and an amplitude of the second additional signal can be sensed). For example, as shown in the example of FIG. 1, the circuitry controller 116 can include an amplitude sensor 162 that can sense amplitude of the second signal and the second additional signal.

Next, as shown in the example of FIG. 4D, at block 448 the amplitude of the second signal and the second additional signal can be adjusted (e.g., increased) based on the sensed amplitude of the second signal and the second additional signal. Next, as shown in the example of FIG. 4D, at decision block 450 it is determined by the circuitry controller whether the adjusting the amplitude of the second signal is finished (and whether the adjusting the amplitude of the second additional signal is finished). For example, at decision block 450 it is determined whether the ramping up adjustment to increase amplitude of the second signal is finished (and whether the ramping up adjustment to increase amplitude of the second additional signal is finished). If it is determined that the adjusting the amplitude of the second signal and the second additional signal is not finished, for example ramping up adjustment is not finished, then flow of execution can be redirected to block 446 to sense amplitude of the second signal (and, for example, to sense amplitude of the second additional signal). However, if it is determined by the circuitry controller that the adjusting the amplitude of the second signal is finished for example, ramping up is finished (and, for example, that the adjusting amplitude of the second additional signal is finished, for example, ramping up is finished), then flow of execution can be directed to block 452 of FIG. 4E.

Figure 4E:
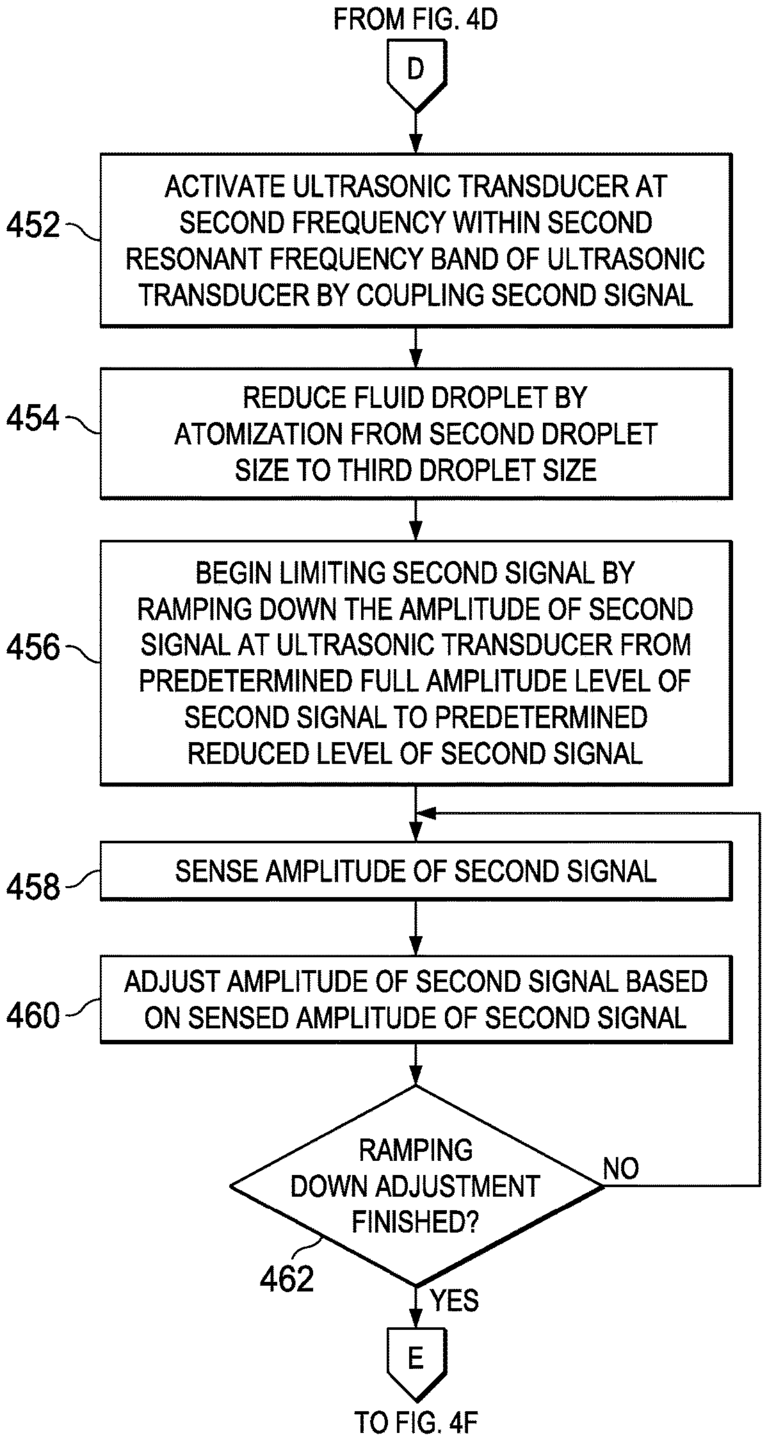

Next, as shown in the example of FIG. 4E, at block 452 the ultrasonic transducer is activated at the second frequency within the second resonant frequency band of the ultrasonic transducer by coupling the second signal (and the second additional signal) with the ultrasonic transducer. At block 454, the activated ultrasonic transducer can expel fluid from the droplet to reduce the droplet by atomization from the second droplet size to the third droplet size. For example, as shown in the example of FIG. 1, the ultrasonic transducer 106 can be activated at the second frequency within the second resonant frequency band of the ultrasonic transducer 106, for example, by coupling the second signal and the second additional signal to reduce the fluid droplet 102 by atomization from the second droplet size 102*b* to the third droplet size 102*c*.

Next, as shown in the example of FIG. 4E, at block 456 the limiting of the second signal (and limiting of the second additional signal) by ramping down the amplitude of second signal (and by ramping down the second additional signal) at the ultrasonic transducer can begin. For example, respective amplitudes of the second signal and the second additional signal can be ramped down (e.g., decreased) by the circuitry controller from their respective predetermined full amplitude levels to their respective predetermined reduced amplitude levels at a predetermined ramp down rate. For example, such limiting can include ramping down from the predetermined full amplitude level of the second signal to the predetermined reduced level of the second signal, and can include ramping down from the predetermined full amplitude level of the second additional signal to the predetermined reduced level of the second additional signal. At block 458 the amplitude of second signal can be sensed (and the amplitude of the second additional signal can be sensed). As shown in the example of FIG. 4E, at block 460 amplitude of the second signal can be adjusted based on sensed amplitude of second signal, and similarly, amplitude of the second additional signal can be adjusted based on sensed amplitude of second additional signal.

As shown in the example of FIG. 4E, at decision block 462 it is determined by the circuitry controller whether the adjusting the amplitude of the second signal is finished (and whether the adjusting amplitude of the second additional signal is finished). For example, at decision block 462 it is determined by the circuitry controller whether the ramping down adjustment to decrease amplitude of the second signal is finished (and whether the ramping down adjustment to decrease amplitude of the second additional signal is finished). If it is determined by the circuitry controller that the adjusting amplitude of the second signal is not finished, for example ramping down adjustment is not finished (and, for example, that the adjusting amplitude of the second additional signal is not finished, for example, ramping down is not finished), then flow of execution can be redirected to block 458 to sense amplitude of the second signal (and, for example, to sense amplitude of the second additional signal). However, if it is determined by the circuitry controller that the adjusting amplitude of the second signal is finished for example, ramping down is finished (and, for example, that the adjusting amplitude of the second additional signal is finished, for example, ramping down is finished), then flow of execution can be directed to block 464 of FIG. 4F.

Figure 4F:
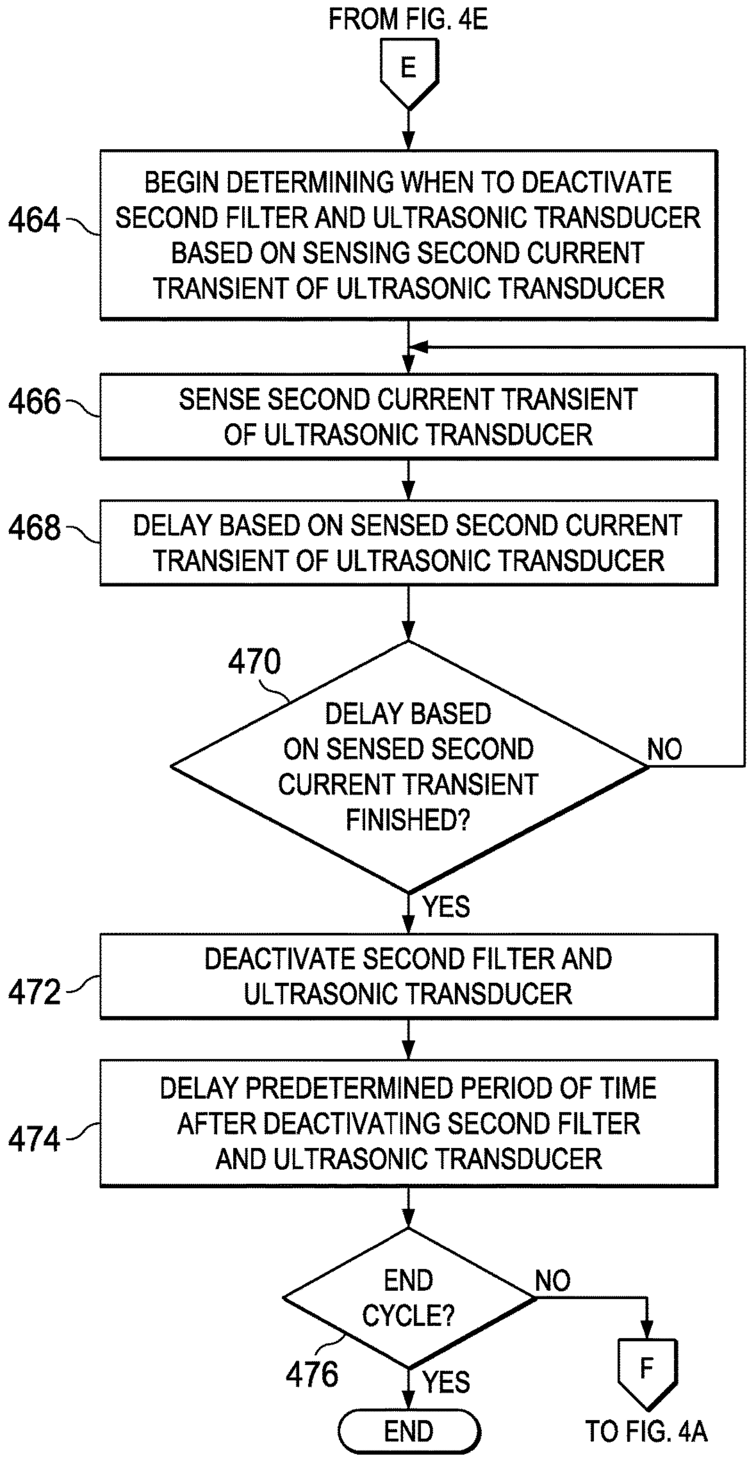

As shown in the example of FIG. 4F, at block 464 determining when to deactivate second filter (and deactivate the second additional filter) and deactivate the ultrasonic transducer based on sensing the second current transient of ultrasonic transducer can begin. At block 466 the second current transient of ultrasonic transducer can be sensed. At block 468, delay in deactivating the second filter (and deactivating the second additional filter) and deactivating the ultrasonic transducer can be based on the sensed second current transient of ultrasonic transducer. For example, as shown in the example of FIG. 1, the circuitry controller 116 can begin determining when to deactivate the second filter 114*a* (and the second additional filter 114*b*) and the ultrasonic transducer 106 based on sensing the second current transient of the ultrasonic transducer 106. As shown for example in FIG. 1, the ultrasonic transducer current sensor 172 can be coupled to the ultrasonic transducer 106 to sense current transients, for example, to sense the second current transient of the ultrasonic transducer.

As shown in FIG. 4F, at decision block 470 it can be determined by the circuitry controller whether delaying deactivation of the second filter (and deactivation of the second additional filter) and deactivation of the ultrasonic transducer based on the sensed second current transient of the ultrasonic transducer is finished. If it is determined by the circuitry controller that delaying such deactivation is not finished, then flow of execution can be redirected to block 466 to sense amplitude of the second current transient of the ultrasonic transducer. However, if it is determined by the circuitry controller that delaying such deactivation is finished, then flow of execution can be directed to block 472 of FIG. 4F. At block 472 of FIG. 4F, the second filter and the second additional filter and the ultrasonic transducer are deactivated, when delaying such deactivation is finished.

Next, after deactivating the second filter (and the second additional filter) and the ultrasonic transducer, as shown in the example of FIG. 4F, at block 474 there can be a delay of a predetermined period of time. For example, as shown in the example of FIG. 1, the circuitry controller 116 can use, for example, timer 182 to delay the predetermined period of time after deactivating the second filter 114*a* (and the second additional filter 114*b*) and deactivating the ultrasonic transducer 106.

Next, as shown in the example of FIG. 4F, at decision block 476 it is determined whether to end the cycle of expelling fluid from the optical surface. For example, if a control input registered at a time determines that the cycle is not to end at that time, then flow execution transfers to block 404 shown in FIG. 4A. However, if a control input registered at that time determines that the cycle is to end at that time, then after block 476, the example method 400 can end.

Figure 5:
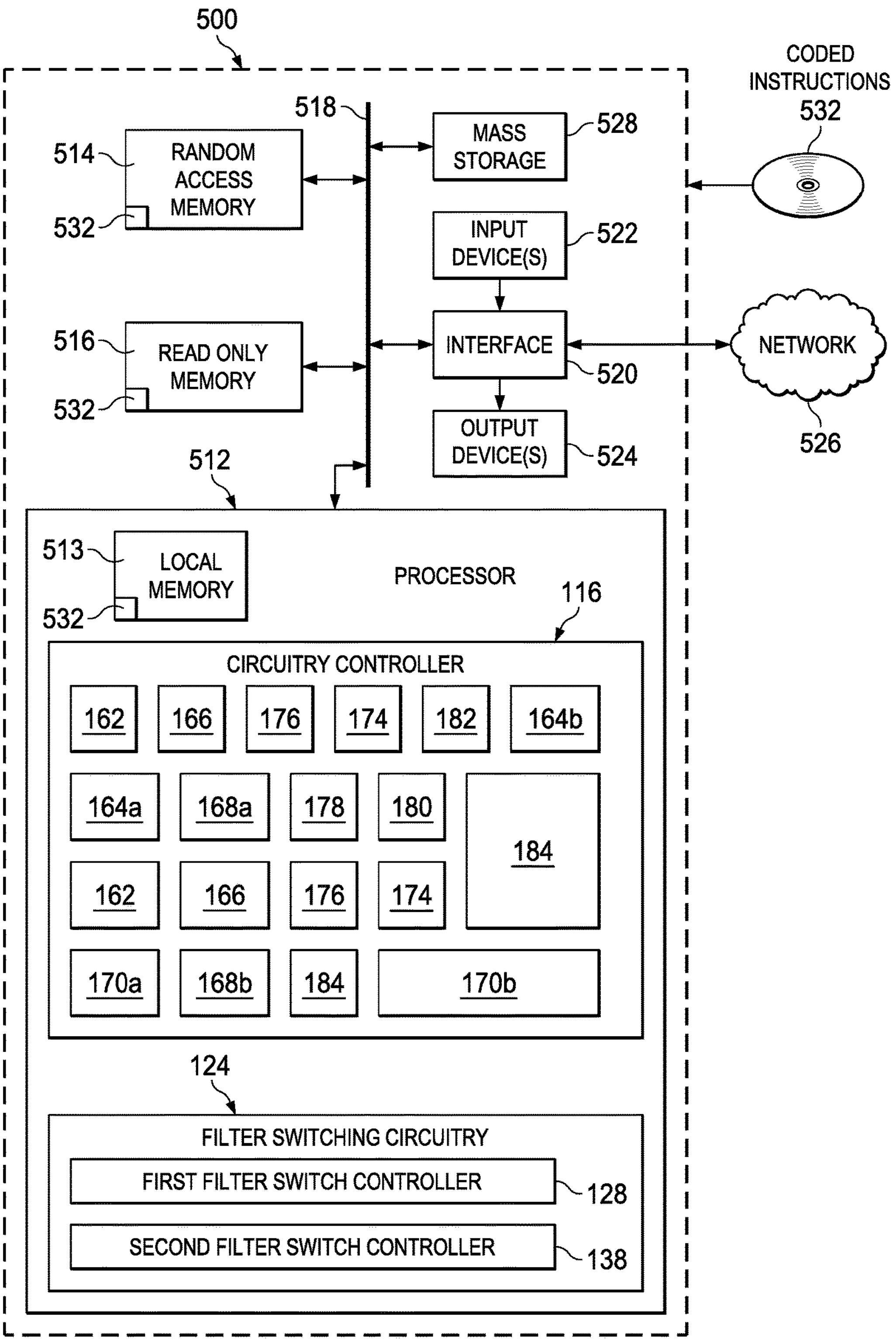
FIG. 5 is a block diagram of an example processing platform capable of executing the machine readable instructions of FIGS. 4A-4F to implement the example system to expel fluid from the droplet on the optical surface using the ultrasonic transducer mechanically coupled to the optical surface, according to an embodiment as shown in the example of FIG. 1.

FIG. 5 is a block diagram of an example processing platform capable of executing the machine readable instructions of FIGS. 4A-4F to implement the example system to expel fluid from the droplet on the optical surface using the ultrasonic transducer mechanically coupled to the optical surface, according to an embodiment as shown in the example of FIG. 1.

The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. The hardware of processor 512 can be virtualized using virtualization such as Virtual Machines and/or containers. The processor 512 can implement example circuitry controller 116, including example amplitude sensor 162, example first sensed amplitude 164*a*, example first additional sensed amplitude 164*b*, example amplitude comparator 166, example ascending target amplitude 168*a*, example descending target amplitude 168*b*, example second sensed amplitude 170*a*, example second additional sensed amplitude 170*b*, example ultrasonic transducer current sensor 172, example first current sensing 174, example current transient comparator 176, example current transient threshold 178, example second current sensing 180, example timer 182 and example cycle controller 184. The processor 512 can also implement example filter switching circuitry 124 including example first filter switch controller 128 and second filter switch controller 138. The processor 512, in implementing circuitry controller 116, can generate the first signal (and first additional signal) having the first frequency and can generate the second signal (and second additional signal) having the second frequency using methods such as pulse-width modulation (PWM) or direct digital synthesis (DDS).

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by FLASH memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 5 may be stored in the mass storage device 528, in the volatile memory 514, in the non-volatile memory 516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:

an amplifier having an amplifier output, the amplifier output having an amplifier impedance; and a filter having a filter input and a filter output, the filter input coupled to the amplifier output, the filter output adapted to be coupled to an ultrasonic transducer, the ultrasonic transducer having a transducer impedance and mechanically coupled to a surface, the filter tunable within resonant frequency bands of the surface, and the filter configured to facilitate matching of the amplifier impedance with the transducer impedance to reduce a droplet on the surface by atomization.

2. The apparatus of claim 1, wherein the filter includes: a first filter tunable within a first resonant frequency band of the surface; and a second filter tunable within a second resonant frequency band of the surface.

3. An apparatus, comprising:

an amplifier having an amplifier output, the amplifier output having an amplifier impedance;

a first filter having a first filter input and a first filter output, the first filter input coupled to the amplifier output, the first filter output adapted to be coupled to an ultrasonic transducer, the ultrasonic transducer having a transducer impedance and mechanically coupled to a surface, the first filter tunable within a first resonant frequency band of the surface, and the first filter configured to facilitate matching of the amplifier impedance with the transducer impedance to reduce by atomization a droplet on the surface from a first droplet size to a second droplet size in a first expelling mode; and a second filter having a second filter input and a second filter output, the second filter input coupled to the amplifier output, the second filter output adapted to be coupled to the ultrasonic transducer, the second filter tunable within a second resonant frequency band of the surface, and the second filter configured to facilitate matching of the amplifier impedance with the transducer impedance to reduce by atomization the droplet from the second droplet size to a third droplet size in a second expelling mode.

4. The apparatus of claim 3, wherein the first resonant frequency band is higher in frequency than the second resonant frequency band.

5. The apparatus of claim 3, wherein the amplifier has an amplifier input, and the apparatus further comprises a controller having a controller output coupled to the amplifier input.

6. The apparatus of claim 5, wherein the controller is configured to cause: the first filter to generate a first signal at the first filter output, the first signal having a first frequency within the first resonant frequency band; and the second filter to generate a second signal at the second filter output, the second signal having a second frequency within the second resonant frequency band.

7. The apparatus of claim 3, further comprising the filter switching circuitry coupled between the controller and the first filter, the filter switching circuitry configured to activate the first filter in response to a control signal from the circuitry controller.

8. The apparatus of claim 7, wherein the control signal is a first control signal, and the filter switching circuitry is coupled between the controller and the second filter, the filter switching circuitry configured to activate the second filter in response to a second control signal from the controller.

9. The apparatus of claim 3, further comprising filter switching circuitry, the filter switching circuitry including:

an ultrasonic transducer coupler;

a high side switch coupled between the first filter and the a first ultrasonic transducer coupler; and a filter switch controller coupled to the high side switch, the filter switch controller configured to control the high side switch in a first high side switch state when the first filter is to be activated for coupling with the ultrasonic transducer coupler, and to control the first high side switch in a second high side switch state when the first filter is to be deactivated from coupling with the ultrasonic transducer coupler.

10. The apparatus of claim 9, wherein the filter switching circuitry includes:

a low side switch coupled between the first filter and a ground reference; and the filter switch controller is coupled to the low side switch, and the filter switch controller is configured to control the low side switch in a first low side switch state when the first filter is to be activated, and to control the low side switch in a second low side switch state when the first filter is to be deactivated.

11. The apparatus of claim 10, wherein the ultrasonic transducer coupler is a first ultrasonic transducer coupler, the high side switch is a first high side switch, and the filter switching circuitry includes:

a second ultrasonic transducer coupler; and a second high side switch coupled between the second filter and the second ultrasonic transducer coupler; and the filter switch controller is coupled to the second high side switch, and the filter switch controller is configured to control the second high side switch in the first high side switch state when the second filter is to be activated for coupling with the second ultrasonic transducer coupler, and to control the second high side switch in the second high side switch state when the second filter is to be deactivated from coupling with the second ultrasonic transducer coupler.

12. The apparatus of claim 11, wherein the filter switching circuitry includes:

a second low side switch coupled between the second filter and the ground reference; and the filter switch controller is coupled to the second low side switch, and the filter switch controller is configured to control the second low side switch in the first low side switch state when the second filter is to be activated, and to control the second low side switch in the second low side switch state when the second filter is to be deactivated.

13. The apparatus of claim 3, wherein the amplifier is a first amplifier, and the apparatus further comprises a second amplifier and a pair of ultrasonic transducer couplers, the pair of ultrasonic transducer couplers configured to couple a bridge tied load including the ultrasonic transducer between the first amplifier and the second amplifier.

14. The apparatus of claim 3, wherein the first filter is a first filter network, and the apparatus includes a second filter network and a pair of ultrasonic transducer couplers, the pair of ultrasonic transducer couplers configured to couple a bridge tied load including the ultrasonic transducer between the first filter network and the second filter network.

15. The apparatus of claim 14, wherein the pair of ultrasonic transducer couplers is coupled between the first filter network and the second filter network in a balanced filter including the first filter network and the second filter network.

16. The apparatus of claim 15, wherein:

the first filter network has a first filter network quality factor;

the balanced filter has a balanced filter quality factor; and the balanced filter quality factor is greater than the first filter network quality factor.

17. A method, comprising:

activating a filter tuned within a resonant frequency band of an ultrasonic transducer to facilitate matching an output impedance of an amplifier with an impedance of the ultrasonic transducer, the ultrasonic transducer mechanically coupled to a surface;

generating a signal including a frequency within the resonant frequency band of the ultrasonic transducer; and reducing by atomization a droplet on the surface from a first droplet size to a second droplet size.

18. The method of claim 17, further comprising:

limiting the signal;

sensing a current transient of the ultrasonic transducer;

determining when to deactivate the filter based on sensing the current transient; and deactivating the filter when it is determined to deactivate the first filter based on sensing the current transient.

19. The method of claim 18, wherein the filter is a first filter, the resonant frequency band is a first resonant frequency band, the signal is a first signal, the frequency is a first frequency, the current transient is a first current transient, and the method further comprises:

activating a second filter tuned within a second resonant frequency band of the ultrasonic transducer to facilitate matching the output impedance of the amplifier with the impedance of the ultrasonic transducer;

generating a second signal including a second frequency within the second resonant frequency band of the ultrasonic transducer;

reducing by atomization the droplet from the second droplet size to a third droplet size;

limiting the second signal;

sensing a second current transient of the ultrasonic transducer;

determining when to deactivate the second filter based on sensing the second current transient; and deactivating the second filter when it is determined to deactivate the second filter based on sensing the second current transient.

20. The method of claim 19, further comprising:

ramping up an amplitude of the first signal at the ultrasonic transducer from a predetermined initial amplitude level of the first signal to a predetermined full amplitude level of the first signal; and ramping up an amplitude of the second signal at the ultrasonic transducer from a predetermined initial amplitude level of the second signal to a predetermined full amplitude level of the second signal;

wherein limiting the first signal includes ramping down the amplitude of the first signal at the ultrasonic transducer from the predetermined full amplitude level of the first signal to a predetermined reduced level of the first signal; and wherein limiting the second signal includes ramping down the amplitude of the second signal at the ultrasonic transducer from the predetermined full amplitude level of the second signal to a predetermined reduced level of the second signal.

* * * * *